United States Patent
Brothers, Jr. et al.

(10) Patent No.: US 7,989,010 B2
(45) Date of Patent: Aug. 2, 2011

(54) METHOD OF REDUCING OFF-FLAVOR IN A BEVERAGE USING SILANE-TREATED SILICA FILTER MEDIA

(75) Inventors: Herbert Martin Brothers, Jr., Midland, MI (US); Gary L. Gibson, Midland, MI (US); James E. Matherly, Jr., Bay City, MI (US); Margo Lynn McIvor, Sanford, MI (US); Anthony Revis, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 1048 days.

(21) Appl. No.: 11/720,739

(22) PCT Filed: Dec. 1, 2005

(86) PCT No.: PCT/US2005/043674
§ 371 (c)(1),
(2), (4) Date: Jul. 17, 2007

(87) PCT Pub. No.: WO2006/065556
PCT Pub. Date: Jun. 22, 2006

(65) Prior Publication Data
US 2009/0232950 A1 Sep. 17, 2009

Related U.S. Application Data

(60) Provisional application No. 60/638,417, filed on Dec. 16, 2004.

(51) Int. Cl.
*A23L 2/00* (2006.01)
(52) U.S. Cl. ...................... 426/271; 426/330.1; 426/423; 426/424
(58) Field of Classification Search ............... 426/330.3, 426/423, 424, 271
See application file for complete search history.

(56) References Cited

U.S. PATENT DOCUMENTS 3,711,293 A * 1/1973 Geiger et al. ................. 426/271
5,177,129 A 1/1993 Bobo, Jr.
5,194,279 A 3/1993 Okel
6,001,406 A * 12/1999 Katzke et al. ................. 426/422
6,228,968 B1 5/2001 Yoshioka
2003/0072845 A1 4/2003 Shimizu et al.
2004/0211724 A1 10/2004 Gibson
2009/0214701 A1 * 8/2009 Forchhammer et al. ........ 426/11

FOREIGN PATENT DOCUMENTS

| EP | 0576756 B1 | 1/1994 |
| JP | 63-137668 | 6/1988 |
| WO | WO 01/53448 A1 | 7/2001 |
| WO | WO 02/04593 A1 | 1/2002 |
| WO | WO 2005/117616 A2 | 12/2005 |

OTHER PUBLICATIONS

Hayase et al., "Characteristic Stale Flavor Formed While Storing Beer", Lee et al, Ed., *Chemical Markers for Processed and Stored Foods*, ACS Symposium Series 631, Aug. 20-24, 1995, pp. 118-128.
McCarthy, Stephen L., "Analysis of Diacetyl and 2,3-Pentanedione in Beer by HPLC with Fluorometric Detection", J. Am. Soc. Brew. Chem. 53(4):178-181, 1995.
Morrison et al., "Today's Diacetyl: The Total Vicinal Diketone Profile of Beer", MBAA Technical Quarterly, vol. 24, pp. 14-20, 1987.
Sakuma et al., "Flavor Characteristics of *cis*-3-Nonenal in Beer", J. Am. Soc. Brew. Chem. 52(2): 37-41, 1994.
Wang, Zhijian, "The Formation of Aldehydes in Beer", Food Industry, No. 4, 2004, Hebei Belfry Group Handan Beer Co., Ltd. (English translation included).

* cited by examiner

*Primary Examiner* — Anthony Weier
(74) *Attorney, Agent, or Firm* — Perkins Coie LLP; Viola T. Kung

(57) ABSTRACT

The present invention provides a method for preventing or reducing off-flavor in a beverage. Silane-treated silica filter media are synthesized. By contacting the beverage with the silane-treated silica filter, one or more off-flavor substances or off-flavor precursors bind to the silane-treated silica filter media and are removed. Beverages that tend to develop off-flavor upon storage such as alcoholic, fruit, and vegetable beverages, are suitable for the present invention. The present invention provides a method that can reduce the level of off-flavor substances such as trans-2-nonenal, diacetyl, and cis-3-nonenal. The present invention also provides a method that can reduce the level of off-flavor precursors such as linoleic acid. The silica filter media useful for the present method include rice hull ash, oat hull ash, or diatomaceous earth.

36 Claims, No Drawings

METHOD OF REDUCING OFF-FLAVOR IN A BEVERAGE USING SILANE-TREATED SILICA FILTER MEDIA

This application is a National Stage of International Application PCT/US2005/043674, filed Dec. 1, 2005, published Jun. 22, 2006, under PCT Article 21(2) in English; which claims the priority of U.S. Provisional Application No. 60/638,417, filed Dec. 16, 2004.

FIELD OF THE INVENTION

This invention relates to a method for preventing or reducing off-flavor in alcoholic, fruit, and vegetable beverages. More particularly, the invention relates to the use of silane-treated silica filter media such as rice hull ash for removing one or more off-flavor substances or off-flavor precursors from a beverage such as beer.

BACKGROUND OF THE INVENTION

Off-flavors are unpleasant or unwanted odors or flavors imparted to food through internal deteriorative change. They are perceived by the human senses of taste and smell, some at extremely low concentrations; for example, parts per million (ppm, $10^{-6}$), parts per billion (ppb, $10^{-9}$) or even parts per trillion (ppt, $10^{-12}$). In general, off-flavors pose no health threats. All organic based foods including beverages can form off-flavors.

Flavor plays a very important role in the quality of beer, and off-flavors are a problem in the beer industry. Certain off-flavors that are produced during storage are expressed as stale flavors by using terms such as cardboard, metallic, sulfury, astringent, aldehydic, musty, buttery and butterscotch. Staling off-flavors are of major concern to the brewing industry. Staling occurs when trace levels of aldehydes and other volatile organics are formed upon storage. When staling occurs, the beer cannot be used, which results in significant financial losses for the manufacturer. Prevention of staling to date has involved primarily packaging strategies, raw material control, and restrictive shelf-life dating.

Off-flavors occur naturally in beer through the breakdown of lipids, fatty acids and other biomaterials used to brew the beer. Oxygen, temperature and storage time are primary contributors to off-flavor formation. Enzymes, trace metals and other species may also contribute to the deterioration of beer quality (Irwin, et al., J. Am. Soc. Brew. Chem., 49: 140-149 (1991)). Oxygen, however, seems to be a key culprit in the formation of stale off-flavors.

The production or presence of carbonyl compounds and Maillard compounds often causes off-flavor. These reaction intermediates and final reaction products can also cause off flavor. Examples of carbonyl compounds include propanal, hexanal, hexenal, pentanal, furfural, trans-2-nonenal and phenylacetaldehyde. Examples of Maillard compounds include 5-hydroxymethylfurfural and Amadori substances, including precursors thereof, which are the reaction products of sugars (such as glucose and fructose) and amino acids. The Amadori substances include glucose-glycine, glucose-alanine, glucose-leucine, glucose-isoleucine, fructose-proline, fructose-glutamic acid, fructose-serine, and fructose-threonine. Other substances that can cause off-flavor include heterocyclic compounds having a pyrazine ring, pyrrole ring, or imidazole ring such as pyrazine, 2-methylpyrazine, 2,5-dimethylpyrazine, 2,3-dimethylpyrazine, and trimethylpyrazine, for which the Maillard reaction has progressed. Decomposition of unsaturated fatty acids can also cause off-flavor (see EP 1300461).

U.S. Patent Publication No. 2003/0072845 discloses a method of producing a malt alcohol beverage comprising removing through adsorption rough flavor components from malt, a malt alcohol beverage intermediate product, or the malt alcohol beverage with the aid of an ion-exchange resin adsorbent of styrene, acrylic, and methacrylic polymers.

WO01/53488 (Owades) discloses a method of improving the flavor stability of a brewed fermented malt beverage to oxidation, which comprises contacting the malt beverage with toasted dried oak wood particles during aging for a period of at least one week.

U.S. Pat. No. 5,177,129 discloses a method for improving the flavor protecting properties of an interior container coating composition by inclusion of cyclodextrins in the composition.

There is a need for an improved and less costly process that is suitable for preventing or reducing off-flavor development in beverages. Such a system uses low-cost raw materials and is suitable for a large-scale production and requires no pre-treatment of a sample.

SUMMARY OF THE INVENTION

The present invention is directed to a method for preventing and/or reducing off-flavor from a beverage. Beverages that tend to develop off-flavor upon storage are suitable for the present invention. Such beverages include alcoholic, fruit, and vegetable beverages.

The present invention provides a method that can reduce the level of off-flavor substances such as trans-2-nonenal, diacetyl, and cis-3-nonenal. The present invention also provides a method that can reduce the level of off-flavor precursors such as linoleic acid.

The present method comprises the steps of (a) contacting a beverage sample with silica filter media whose surface active groups have been reacted with one or more silanes, (b) binding one or more off-flavor substances or off-flavor precursors in the beverage sample to the silica filter media, and (c) separating the beverage sample from the silica filter media. The separation is carried out by filtration, decantation, or centrifugation. The silica filter media useful for the present method include rice hull ash, oat hull ash, or diatomaceous earth. Silanes useful for treating the silica filter media in general comprise a hydrolyzable moiety such as alkoxy, halogen, hydroxy, aryloxy, amino, carboxy, cyano, aminoacyl, acylamino, alkyl ester, aryl ester, which reacts with the active group on the silica filter media.

DETAILED DESCRIPTION OF THE INVENTION

The present invention provides a method for preventing or reducing off-flavor in a beverage. Silane-treated silica filter media are prepared. By contacting the beverage with the silane-treated silica filter, one or more off-flavor components bind to the silane-treated silica filter media and are removed. In addition, particulates in the beverage are removed.

Off-flavors by definition are unpleasant odors or tastes, which are undesirable to a beverage. Off-flavors are atypical favors, which are often associated with internal deterioration of the beverage. As used herein, off flavor components include off-flavor substances and off-flavor precursors. Off-flavor substances are materials that produce or cause unpleasant odors or tastes. Off-flavor precursors are materials from which off-flavor substances are formed.

Beverages that tend to develop off-flavor upon storage are suitable for the present invention. Such beverages include alcoholic, fruit, and vegetable beverages. Alcoholic beverages include those that are made by the fermentation of hopped malt wort, such as beer, ales, lagers, stouts and Happoshu. Alcoholic beverages also include those that are made by the fermentation of fruits, such as wine, whiskey, fortified wine products (sherry, brandy and cognac), rum, liquors and cordials. Fruit beverages include those derived from fruit origin such as fruit juices, for example, apple, cranberry, grape, citrus fruit, peach, pear, plum, apricot and nectarine juices. Vegetable beverages include those derived from vegetable origins such as vegetable juices such as tomato, carrot, celery, parsley, spinach, wheatgrass, kale, cucumber, pine needles, dropwort, mugwort, beet, radish, arrowroot juices. The present invention is particularly suitable for reducing or preventing off-flavor in beer.

Changes in beer flavor take place over time, even when stored at low temperatures. The changes are accelerated when the beer is exposed to heat, light or oxygen. Beer stored above 20° C. gradually develops a stale, papery or cardboard-like flavor. Off-flavor substances in beers include unsaturated long-chain carbonyl compounds, the most significant being trans-2-nonenal. While most of these long-chain carbonyls have a flavor threshold of 1.0 µg/liter or greater, trans-2-nonenal has a distinct cardboard off-flavor that is detectable by sensory methods at only 0.1 µg/L (1 ppb). Trans-2-nonenal is believed to originate from the oxidative degradation of lipids that originate in the barley. Oxidation of unsaturated fatty acids, in particularly, linoleic acid, leads to formation of hydroperoxides, which then undergo further reactions, ultimately leading to volatile, highly flavor-active aldehydes, such as trans-2-nonenal. The formation of trans-2-nonenal may be catalyzed by a specific enzyme (lipoxygenase) during the malting or mashing processes. The formation of trans-2-nonenal may also be stimulated by non-enzyme substances such as metal ions, especially those of iron, aluminum or copper. (see G. Freeman, M. McKechnie, "Filtration", Chapter 16, Fermented Beverage Production, Second Edition, Kluwer Academic/Plenum Publishers, p. 366; M. Uchida, M. Ohno, J. Am. Soc. Brew. Chem., 8-13 (2000); and G. Lermusieau, S. Noel, C. Liegeois, S. Collins, J. Am. Soc. Brew. Chem., 29 (1999)).

Off-flavor substance cis-3-nonenal has a soybean-oil-like flavor. The flavor threshold of cis-3-nonenal in beer was reported to be 0.5 µg/L (Sakuma, et al. J. Am. Soc. Brew. Chem. 52: 37-41 (1994)).

Off-flavor substance diacetyl, also known as 2,3-butanedione, is a compound responsible for buttery or butterscotch off-flavor. Diacetyl is detectable by sensory methods at 0.1 mg/L. Diacetyl is the breakdown product of pyruvate, which by oxidation forms acetaldehyde as an intermediate. The breakdown continues through acetoacidic acid and then forms diacetyl.

Other off-flavor carbonyl substances include 4-mercaptopentan-2-one and oct-1-en-3-one, which produce blackcurrant bud and metallic flavors (Technical Quarterly, 37: 165-171 (2000)); trans-2-heptenal, which produces cardboard flavor (Lee and Kim, ACS Symposium Series 631, Chemical Markers for Processed and Stored Foods, 1996, Chapter 11); E-2-octenal, E,Z-2,6-nonadienal and E,E-2,4-decadienal. (J. Chromatogr. A, 2030, 986, 101-110)

Off-flavor precursors are materials from which off-flavor substances are formed. Unsaturated long-chain fatty acids, which decompose to form off-flavor substances, often are off-flavor precursors. For example, linoliec acid, which decomposes to form trans-2-nonenal, is an off-flavor precursor.

Beverage off-flavor can be measured by various methods known to a skilled person. A preferred method for the detection and quantitation of off-flavors is sensory analysis (Sakuma, et al., J. Am. Soc. Brew. Chem. 54:37-41 (1994); The Practice Brewer, A Manual for the Brewing Industry, 3$^{rd}$ Edition, J. T McCabe, editor, p. 381-406 (1999); Standards of Brewing, A Practical Approach to Consistency and Excellence, C. W. Bamford, Brewers Publication, p 144 (2002) ISBN 0-937381-79-9; Trainer in a Box, The Beer Flavour Handbook, Version 2.0, 2$^{nd}$ Edition, Flavoractiv, p 24-29 (2002), Chinnor, UK). In fact, taste and smell are the leading methods for the entire food industry when dealing with off-flavors. Instrumental methods for off-flavors are only a complementary technique because of the very low detection thresholds. Despite the very low detection limits, methods such as high performance liquid chromatography (HPLC), gas chromatography (GC) and gas chromatographic mass spectroscopy have been used to identify, and quantify off-flavors. These methods of analysis of off-flavors are reported for both trans-2-nonenal and diacetyl (Verhagen, Int. J. Environ. Anal. Chem., 25: 67-79 (1986); McCarthy, J. Am. Soc. Brew. Chem. 53:178-181 (1995); Morrison, MBAA Technical Quarterly, 24: 14-20, (1987)).

The present invention provides a method for preventing or reducing off-flavor in a beverage. The present invention reduces the level of off-flavor substances such as trans-2-nonenal, diacetyl, cis-3-nonenal, 4-mercaptopentan-2-one, oct-1-en-3-one, trans-2-heptenal, E-2-octenal, E,Z-2,6-nonadienal and E,E-2,4-decadienal. The present invention also reduces the level of off-flavor precursors such as linoleic acid. The method comprises the steps of: (a) contacting a beverage sample with silica filter media whose surface active groups have been reacted with one or more silanes, (b) binding one or more off-flavor substances or off-flavor precursors to the silica filter media, and (c) separating the beverage sample from the silica filter media. The separation is carried out, for example, by filtration, decantation, or centrifugation. Filtration is one of the preferred methods.

Filtration is the removal of particulates by passing a feed stream through a porous media. Particulates are captured on the filter media through a variety of mechanisms including physical entrapment, and binding to the media.

Filter media, also known as filter aids, can be loose particulate or structured material. They are solid materials in a particulate form, insoluble in the liquid to be filtered; they are added to the liquid or are coated upon a filter or filter support. The purpose of using filter media is to speed up filtration, reduce fouling of the filter surface, reduce cracking of the filter layer, or otherwise to improve filtration characteristics. Filter media are often described according to their physical form. Some filter media are essentially discrete membranes, which function by retaining contaminants upon the surface of the membrane (surface filters). These filter media primarily operate via mechanical straining, and it is necessary that the pore size of the filter medium be smaller than the particle size of the contaminants that are to be removed from the fluid. Such a filter medium normally exhibits low flow rates and a tendency to clog rapidly.

Other filter media take the form of a porous cake or bed of fine fibrous or particulate material deposited on a porous support or substrate. The solution being filtered must wend its way through a path of pores formed in the interstices of the fine material, leaving particulate contaminants to be retained by the filter material. Because of the deepness of the filter material, the filters are called depth filters (as opposed to surface filters). The ability to achieve the required removal of suspended particulate contaminants with a filter medium of significantly larger pore size is attractive inasmuch as it allows higher flow rates. Furthermore, the filters have a higher capacity to retain particulates, thus having a reduced tendency to clog.

The present invention utilizes silane-treated silica media filter of various types to remove off-flavor components as well as particulates in alcoholic, fruit, and vegetable beverages.

The term "particulates" refers to macroscopic insolubles or microscopic particulates. Particulates are often undesirable in a beverage; particulates can also be a source of off-flavor. Macroscopic particulates are those that are visible to the human eye, including, but not limited to precipitates, inclusion bodies, and crystals. Inclusion bodies consist of insoluble and incorrectly folded protein in the cellular compartment. Crystals are formed from supersaturated solutions by aggregation of molecules, occurring in an ordered, repetitive fashion. Precipitates are amorphous form from random aggregation. Macroscopic particulates can be of organic or inorganic origin; they can be derived from the interaction between protein and protein, salt and protein, salt and salt, protein and polymer, etc. Microscopic particulates are those that can be seen under a microscope. Examples of microscopic particulates include microorganisms. Microorganisms when overgrown in a beverage can also form macroscopic particulates. Microorganisms that can be captured and removed from a beverage by the present invention are gram-positive bacteria, gram-negative bacteria, fungi, yeast, mold, virus, etc.

One problem in brewing, winery, juice and other beverage industries is microbial contamination. Heat sterilization and size-based filtration are the most commonly used processes to remove microbial contamination. The main drawback of heat sterilization is that its application is limited to products that are not affected by high temperature. Sized-based filtration has the disadvantages of being expensive and time consuming. In addition, it cannot be used for processes in which the desired components are of the same size as bacteria. The present invention is advantageous in that it can remove off-flavor components (such as trans-2-nonenal, cis-3-nonenal, diacetyl, and linoleic acid) and particulates (such as microorganisms) in a single filtration step; therefore, it is useful to prevent or reduce off-flavor from a variety of beverages that have different components.

The feature of this invention is using treated silica filter media to bind off-flavor substances or precursors. Off-flavor substances or precursors bind to the silane-treated silica filter media through different mechanisms such as hydrophilic, hydrophobic, affinity and/or electrostatic interactions. Silica filter media useful for this invention have surfaces suitable for treatment with silanes and structural characteristics suitable for industrial filtration applications. Examples of silica filter media include, but are not limited to, rice hull ash, oat hull ash, diatomaceous earth, perlite, talc, and clay.

Rice hull ash is a byproduct of rice farming. Each grain of rice is protected with an outer hull, which accounts for 17-24% of the rough weight of the harvested product. Rice hulls consist of 71-87% (w/w) organic materials, such as cellulose and 13-29% (w/w) inorganic materials. A significant portion of the inorganic fraction, 87-97% (w/w) is silica ($SiO_2$). Currently, the inedible rice hulls are used as a source of fuel, fertilizer, and in insulation applications. When the rice hulls are burned, a structured silica material (often greater than 90%) can be produced as a byproduct. Rice hull ash (RHA) has larger surface area and more porous-channeled structure compared with other loose silica filter media. These characteristics make the RHA a preferred treated filter substrate for this invention.

Diatomaceous earth (Diatomite) is a sedimentary silica deposit, composed of the fossilized skeletons of diatoms, one celled algae-like plants which accumulate in marine or fresh water environments. The honeycomb silica structures give diatomite useful characteristics such as absorptive capacity and surface area, chemical stability, and low bulk density. Diatomite contains 90% $SiO_2$ plus Al, Fe, Ca and Mg oxides.

Perlite is a generic term for a naturally occurring siliceous volcanic rock that can be expanded with heat treatment. Expanded perlite can be manufactured to weigh as little as 2 pounds per cubic foot (32 kg/m$^3$). Since perlite is a form of natural glass, it is classified as chemically inert and has a pH of approximately 7. Perlite consists of silica, aluminum, potassium oxide, sodium oxide, iron, calcium oxide, and magnesium oxide. After milling, perlite has a porous structure that is suitable for filtration of coarse microparticulates from liquids it is suitable for depth filtration.

Talc (talcum) is a natural hydrous magnesium silicate, $3MgO.4SiO_2.H_2O$. Clay is hydrated aluminum silicate, $Al_2O_3.SiO_2.xH_2O$. Mixtures of the above silica filter media substrates can also be used to achieve the best filtration and cost performance. The rice hull ash or diatomaceous earth has optionally undergone various purification and/or leaching steps before the surface silane treatment.

Silica filter media are treated by binding a predetermined amount of functional silane (or silanes) to the surface. The silane-treated silica filter media preferably have a similar or improved flow rate compared with the non-treated silica filter media. The treated silica filter media capture components, including off-flavor components, for example, by electrostatic, hydrophilic, hydrophobic, and/or covalent interactions, and/or by physical entrapment. By electrostatic interaction, the charged silica filter media bind to materials in a sample that have the opposite charge. By hydrophilic interaction, the portion of the silica filter media that has a strong affinity for water attracts the polar group of the materials by van der Waals interaction. By hydrophobic interaction, the portion of the silica filter media that contains long hydrocarbon chains attracts the non-polar groups of the materials.

One advantage of the silane treated silica-based materials is the ability to modify the silica materials to increase the binding capacity without increasing filter aid load. In other words, silica filter media can increase its binding capacity by treatment with more silanes or a more efficient silane without significantly increasing the weight of silica materials.

The form of silica filter media substrate materials can be any form suitable for the application, such as spheres, fibers, filaments, sheets, slabs, discs, blocks, films, and others. They can be manufactured into cartridges, disks, plates, membranes, woven materials, screens, etc. For example, bulk filtration in a brewery often use plate and frame filter presses (in Fermented Beverage Production, 2$^{nd}$ Ed. by Lea and Piggott, P. 368-373).

The specific surface area of the untreated silica filter media is preferred to be larger than 1 m$^2$/g; more preferred to be larger than 10 m$^2$/g. Silica filter media with a larger surface area are preferable because they allow more treatment on the surface. In addition, media with large pores improve the filtration rate. However, larger pore materials have relatively lower surface area. The balance of large surface area and large pore size results in effective surface filtration treatment and filtration rate. The surface characteristics of these substrates can be evaluated by techniques such as NMR (Nuclear Magnetic Resonance and other techniques), SEM (Scanning Electron Microscopy), BET (Brunauer-Emmett-Teller) surface area measurement technique, and Carbon-hydrogen-nitrogen content can be determined by combustion techniques, which are well known to the art.

Silanes suitable for surface treatment of silica filter media can be any type of organosilanes, ionic or non-ionic. The general formula of a suitable silane is $(R^1)_xSi(R^2)_{3-x}R^3$, wherein $R^1$ is typically a hydrolysable moiety (such as alkoxy, halogen, hydroxy, aryloxy, amino, amide, methacrylate, mercapto, carbonyl, urethane, pyrrole, carboxy, cyano, aminoacyl, or acylamino, alkyl ester, or aryl ester), which reacts with the active group on the silica filter media; a preferred hydrolysable moiety is alkoxy group, for example, a methoxy or an ethoxy group;

$1 \leq x \leq 3$, more than one siloxane bond can be formed between the filter particle and silane;

$R^2$ can be any carbon-bearing moiety that does not react with the filter surface during treatment process, such as substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^3$ can be any organic containing moiety that remains chemically attached to the silicon atom once the surface reaction is completed, and preferably it can interact with the component of interest during filtration; for example $R_3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylakaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium;

wherein the hydrogen of said alkyl, alkenyl, aryl, cycloalkyl, cycloalkenyl, heteroaryl, and heterocyclic is optionally substituted by halogen, hydroxy, amino, carboxy, or cyano.

One or more silanes can be covalently bound to the surface of the hydroxyl bearing porous silica filter media. The surface area of the silica filter media limits the amount of the silanes bound.

Silanes useful for treating silica in this invention preferably have one or more moieties selected from the group consisting of alkoxy, quaternary ammonium, aryl, epoxy, amino, urea, methacrylate, imidazole, carboxy, carbonyl, isocyano, isothiorium, ether, phosphonate, sulfonate, urethane, ureido, sulfhydryl, carboxylate, amide, carbonyl, pyrrole, and ionic. Examples for silanes having an alkoxy moiety are mono-, di-, or trialkoxysilanes, such as n-octadecyltriethoxysilane, n-octytriethoxysilane and phenyltriethoxysilane.

Examples of silanes having a quaternary ammonium moiety are 3-(trimethoxysilyl)propyloctadecyldimethylammoniumchloride, N-trimethoxysilylpropyl-N,N,N-trimethylammoniumchloride, or 3-(N-styrylmethyl-2-aminoethylamino)-propyltrimethoxysilane hydrochloride. Examples of silanes having an aryl moiety are 3-(trimethoxysilyl)-2-(p,m-chlandomethyl)-phenylethane, 2-hydroxy-4-(3-triethoxysilylpropoxy)-diphenylketone, ((chloromethyl)phenylethyl)trimethoxysilane and phenyldimethylethoxysilane. Examples of silanes having an epoxy moiety are 3-glycidoxypropyltrimethoxysilane and 2-(3,4-epoxycyclohexyl)ethyltrimethoxysilane. Examples of silanes having an amino moiety are 3-aminopropyltrimethoxysilane, N-(2-aminoethyl)-3-aminopropyltrimethoxysilane, trimethoxysilylpropyldiethylenetriamine, 2-(trimethoxysilylethyl)pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-aminopropyltriethoxysilane.

Examples of silanes having an urea moiety are N-(triethoxysilylpropyl)urea and N-1-phenylethyl-N'-triethoxysilylpropylurea. An example of silanes having a methacrylate moiety is 3-(trimethoxysilyl)propyl methacrylate. An example of silanes having a sulfhydryl moiety is 3-mercaptopropyltriethoxysilane. Examples of silanes having an imidazole moiety are N-[3-(triethoxysilyl)propyl]imidazole and N-(3-triethoxysilylpropyl)-4,5-dihydroimidazole. Examples of ionic silanes are 3-(trimethoxysilyl)propyl-ethylenediamine triacetic acid trisodium salt; and 3-(trihydroxysilyl)propylmethylphosphonate sodium salt. An examples of silanes having a carbonyl moiety is 3-(triethoxysilyl)propylsuccinic anhydride. Examples of silanes having an isocyano moiety are tris(3-trimethoxysilylpropyl)isocyanurate and 3-isocyanatopropyltriethoxysilane. Examples of silanes having an ether moiety are bis[(3-methyldimethoxysilyl)propyl]-polypropylene oxide and N-(triethoxysilylpropyl)-O-polyethylene oxide urethane.

An example of a silane having a sulfonate moiety is 2-(4-chlorosulfonylphenyl)-ethyltrichlorosilane. An example of a silane having a isothiourium moiety is trimethoxysilylpropylisothiouronium chloride. Examples of silanes having an amide moiety are triethoxysilylpropylethyl-carbamate, N-(3-triethoxysilylpropyl)-gluconamide, and N-(triethoxysilylpropyl)-4-hydroxybutyramide. Examples of silanes having a urethane moiety are N-(triethoxysilylpropyl)-O-polyethylene oxide urethane and O-(propargyloxy)-N-(triethoxysilylpropyl)urethane.

Silica filter media can also be treated with more than one silanes such as N-trimethoxysilylpropyl-N,N,N-trimethylammonium chloride and bis(2-hydroxyethyl)-3-aminopropyltriethoxysilane; 3-aminopropyltrimethoxysilane and N-(triethoxysilylpropyl)-O-polyethylene oxide urethane; 3-trihydrosilylpropylmethylphosphonate, sodium salt and N-(triethoxysilylpropyl)-O-polyethylene oxide urethane; N-trimethoxysilylpropyl-N,N,N—Cl, trimethylammonium chloride and (3-glycidoxypropyl)trimethoxysilane; 3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene oxide urethane; 2-(trimethoxysilylethyl)pyridine and N-(3-triethoxysilylpropyl)-gluconamide; N-trimethoxysilylpropyl-N,N,N—Cl, trimethylammonium chloride and N-(3-triethoxysilylpropyl)-gluconamide; N-trimethoxysilylpropyl-N,N,N—Cl, trimethylammonium chloride and 2-hydroxy-4-(3-triethoxysilylpropoxy)-diphenylketone; 3-mercaptopropyltriethoxysilane and N-(triethoxysilylpropyl)-O-polyethylene oxide urethane; 3-(triethoxysilyl)propylsuccinic anhydride and N-(triethoxysilylpropyl)-O-polyethylene oxide urethane; trimethoxysilylpropylethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and Bis-(2-hydroxyethyl)-3-aminopropyltriethoxysilane.

The silane-treated silica filter media have a general formula selected from the group consisting of particle-O—Si($R^1$)$_x$ ($R^2$)$_{3-x}R^3$,

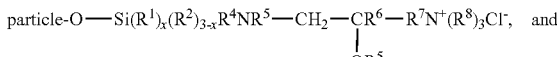
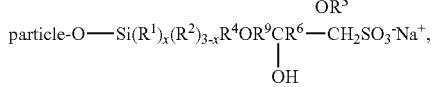

wherein $R^1$, $R^2$, $R^3$, and x are the same as described above so long as there are no more than four groups directly attached to the silicon (Si);

$R^5$, $R^6$, $R^8$ are independently hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, ether, ester or arylalkaryl;

$R^4$, $R^7$, $R^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments;

wherein said particle is rice hull ash, oat hull ash, diatomaceous earth, perlite, talc, or clay.

The silane-reacted silica filter media of the present method preferably have a functional moiety, which can react with a component of interest. The functional moiety is selected from the group consisting of alkoxyl, quaternary ammonium, epoxy, amino, urea, methacrylate, imidazole, sulphonate, carboxyl, cyano, sulfhydryl, carbonyl, isothiorium, phosphonate, and other organic moieties known to react with biological molecules.

The silica filter media with surface silanol are treated with silane in a general reaction scheme as following:

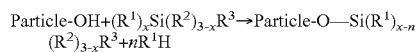

where Particle-OH is a filter particle with reactive sites on surface. For example, $R^1$ is a methoxy ($CH_3O$—) or ethoxy ($CH_3CH_2O$—) labile leaving group of the silane, which chemically interacts, with the reactive hydroxyl group on the particle surface or with other reactive hydrolyzed silane molecules which are not attached to the surface. $1 \leq x \leq 3$; n is the number of $R^1$ groups reacted, and $n \leq x$.

Prolonged reaction of excess amounts of reactive silane under anhydrous conditions results in reaction of only 25% to 50% of the total active sites on the porous material since further reaction is inhibited by steric hindrance between the immobilized residues and is also hindered by access to deeply imbedded Particle-OH groups. For the purposes of this invention, such sterically available sites will be designated as the "saturation coverage" and "saturation coverage" depends upon the steric requirements of a particular residue. Note that this designation of "saturation coverage" is applicable to reactive silanes with one or more labile leaving groups. Under anhydrous conditions, such silanes form monolayers and cannot form multiple layers of undefined saturation. However, under aqueous conditions, multiple layers can be built on the surface with multifunctional silanes.

The surface silane treatment of silica filter media can be carried out by an essentially "wet" or essentially "dry" process. The essentially wet process consists of reacting the silane onto the silica filter media in a solvent (organic solvent or water) and optionally using heat. Heat or solvent is not required for the reaction; however, heat or solvent improves the reaction rate and the uniform surface coverage. The essentially dry process consists of reacting the silane onto the silica filter media in a vapor phase or highly stirred liquid phase by directly mixing the silane with silica filter media and subsequently heating.

A preferred method for treating silica filter media with silanes is adding the reacting silanes gradually to a rapidly stirred solvent, which is in direct contact with the porous silica filter media. Another preferred method is to carry out the treatment in the vapor phase by causing the vapor of the reactive silanes to contact and react with the silica filter media. For example, the porous material is placed in a vacuum reactor and dried under vacuum. The rapidly reacting silane is then allowed to enter the vacuum chamber as a vapor and contact the porous material; after a certain contact time, the byproducts of the reaction are removed under reduced pressure. Then the vacuum is released, and the porous material is removed from the chamber.

The actual treatment process can be carried out in a period from 1 minute to 24 hours. Generally, for purposes of this invention, it is preferred to carry out the treatment over a period from about 30 minutes to 6 hours to ensure that the surface of the filter aid material is uniformly treated. The treatments are carried out at temperatures ranging from 0 to 400° C. Preferred treatment temperatures are from room temperature (22 to 28° C.) to 200°.

The amount of reacting silanes used in this invention depends on the number of surface hydroxyls to be reacted, and the molecular weight of the silane. Typically, a stoichiometric amount equivalent to the available surface hydroxyls plus some excess amount of the reacting silane is used to treat the surface hydroxyls because of the potential side reactions. If a thicker exterior surface treatment is desired, then more reacting silane should be used. Typically, 0 to 10 (preferred), 0 to 20, or 1 to 50 times excess is used. However, it is not uncommon to use from 1 to 500 times excess; which results in more treatment on the particle.

Silanes with hydrolysable groups condense with Particle-OH groups of the surface of the particles, and provide covalent coupling of organic groups to these substrates. For example, the alkoxy groups of the silanes chemically react with the Particle-OH groups of the particle surface. The surface-silane interaction is fast and efficient. For example, when silanes having a quaternary ammonium moiety are used, the protonated positively charged silanes electro-statically attract to the deprotonated groups of the particle efficiently to facilitate fast and efficient reaction.

Silane-reacted silica filter media preferably have a functional moiety, which can react with a component of interest. The functional moiety is selected from the group consisting of quaternary ammonium, epoxy, amino, urea, methacrylate, imidazole, sulphonate and other organic moieties known to react with biological molecules. In addition, the functionally moiety can be further reacted, using well-known methods, to create further new functionalities for other interactions. General schemes for preparation of a silane-reacted particle filter media with a functional quaternary ammonium or sulphonate group are illustrated as follows.

Silane-reacted particle filter media with a functional quaternary ammonium group can be prepared in one step. Optionally, a two-step or three-step process may be employed. For example, in the first step of the two step process, the particle surface is reacted with an amino-functional silane, $(R^1)_x Si(R^2)_{3-x} R^4 N(R^5)_2$, applying the previously described procedure. In the next step, the secondary amine readily reacts with the epoxide group of the glycidyltrimethylammoniumchloride, which is a convenient way to introduce quaternary ammonium functionality. (See Scheme 1)

Scheme 1. Synthesis of quaternary ammonium functional filter aid in two steps.

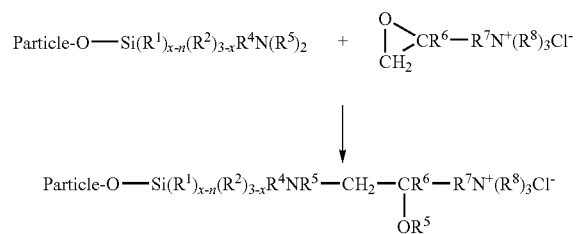

Silane-reacted silica filter media with a functional sulphonate group can be prepared in two steps. In the first step, the particle surface is reacted with an epoxy-functional silane applying the previously described procedure. In the next step, the epoxy functionality readily reacts with sodium bisulfate to produce sulphonate-functional silica filter media. (See Scheme 2). Sodium metabisulfite ($Na_2S_2O_5$) decomposes in water to form sodium bisulfate ($NaHSO_3$).

Scheme 2. Synthesis of sulphonate-functional silica filter media

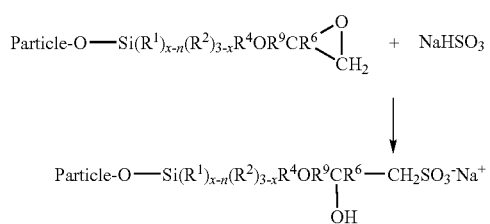

The silane-treated particles are used in separation applications to capture soluble materials through electrostatic, and/or hydrophobic, and/or hydrophilic interaction mechanisms while removing particulates. The advantage of the treated silica filter media is that the separation process is simplified by combining the filtration and solid phase extraction in a single step. The desired quality of the treated silica filter media is to have similar or improved flow rate (filtration properties) in comparison with the untreated silica filter media, along with the capability to bind off-flavors components.

In one embodiment of the invention, specific charged groups are attached covalently to the surface of the silica particles to bind off-flavor components electrostatically. The oppositely charged materials are bound to the porous treated surface. In another embodiment, hydrophobic or hydrophilic ligands are attached covalently to the surface of the silica particles to bind off-flavor components by a hydrophobic or hydrophilic interaction.

Treated silica filter media are characterized by measuring surface area, pore volume and pore size using methods known to the art such as a Micrometrics® analyzer. For example, surface area can be characterized by BET technique. Pore volume and pore diameter can be calculated by Barrett-Joyner-Halenda analysis. Specific functional groups and molecular structure can be determined by NMR spectroscopy. Carbon-hydrogen-nitrogen content can be determined by combustion techniques; from this analysis information, the treatment level on the particle surface can be calculated.

A beverage sample can be applied to silane-treated silica filter media with or without pre-filtration to remove particulates. It is advantageous of the present invention that no pre-filtration step is required. In addition, a beverage sample can be applied to silane-treated silica filter media with or without pre-mixing the beverage with the filter media prior to the separation step. In one embodiment, the sample is mixed with the treated silica filter media by any means of mechanical mixing (such as agitation, stirring, vortexing, etc.) for a period of time to allow sufficient binding of the component to the surface of treated silica filter media. Those skilled in the art will recognize that the time suitable for binding is dependent upon the character of the pores of the media, the characteristics of off-flavor substances or off-flavor precursors, the viscosity of the beverage, and other known kinetic principles. Generally, the time for binding to occur varies from about a few minutes to a few hours, but may continue up to 1-3 days. After the components bind to the treated silica filter media, the beverage is separated from the silica filter media. The separation can be carried out by a variety of methods, for example, filtration, centrifugation, and decantation.

In another embodiment, a beverage sample can be filtered directly through a filtration unit containing silane-treated silica filter media without pre-mixing the sample with the filter media. The treated silica filter media capture particulates and bind off-flavor substances and off-flavor precursors, such as trans-2-nonenal, diacetyl, cis-3-nonenal, and linoleic acid, while allowing the unbound soluble components, to flow through. The filtered beverage sample is collected.

One additional application of the invention is to use the silane-treated silica filter media to simultaneously remove microorganisms, off-flavor precursors, and off-flavor substances from a beverage. Microbial contamination is a common problem across the brewing, winery, juice and other beverage industry. Applicants have found that the silane-treated silica filter media of this invention have anti-microbial activity. By contacting bacteria with the silane-treated silica filter media, the total viable bacterial counts are significantly reduced. The microorganisms are also captured by the silane-treated silica filter media. Thus, the filtration step further removes microbial contamination from the product.

The following examples further illustrate the present invention. These examples are intended merely to be illustrative of the present invention and are not to be construed as being limiting. Examples 1 through 5 illustrate the surface treatment of silica filter media. Examples 6-13 illustrate the antimicrobial activity of the silane-treated silica filter media and the filtration results. Examples 14-17 illustrate the beer treatment with the silane-treated media.

EXAMPLES

Example 1

Preparation of Treated Rice Hull Ash Media (tRHA) Using Trialkoxysilanes in a Batch Process The treatment equipment is composed of a 3-neck, round bottom reaction flask, a Teflon shaft mechanic stirrer, thermometer, condenser, and heating mantle around the flask. The reaction flask was loaded with ungrounded RHA silica filter media (surface area: ~30 m$^2$/g), and solvent mixture. Table 1 shows the reaction conditions for each example. The mixture was stirred for a few minutes at ambient temperature, then the surface modification process involved addition of the proper amount of the silane directly to the mixture in a slow addition rate, while good mixing was maintained. 250% of the proper amount of the silane as calculated to achieve multilayer coverage (high-level treatment) or 85% of the amount of silane as calculated to achieve monolayer coverage (low level treatment) was added and the silane quantity was also corrected for their purity. The loading concentrations are also listed in Table 1. Subsequently, the mixture was heated to reflux under N$_2$ blanket, which is used primarily for safety and has no other affect on the outcome of the reaction, although heating is not required. After 2 hours stirring and refluxing, the treated slurry mixture was allowed to cool. Then it was transferred to a porcelain Büchner funnel outfitted with Whatman filter paper, and attached to a vacuum filter flask. The treated filter slurry was filtered and washed twice with toluene and twice with IPA. Afterward, the sample was dried in the hood for about 24 hours. The treated filter media was transferred to a Pyrex container and covered with a parafilm film having a number of holes made with a syringe needle, and then the sample was dried in a vacuum oven at 60° C. for 2-4 hours. The dried samples were analyzed for surface area, pore structure, and carbon-hydrogen-nitrogen content.

TABLE 1

Summary of treatment compositions and conditions
Treatments are done on low carbon, ungrounded RHA from Producers.

| Sample # | Silica Amount g | Silane Type | Treatment Condition | Silane Purity % | Added Silane g |
|---|---|---|---|---|---|
| 1 | 50 | 3-(trimethoxysilyl)propyloctadecyl-dimethylammonium chloride | H$_2$O, reflux | 42% | 15.06 |
| 2 | 50 | 3-(trimethoxysilyl)propyloctadecyl-dimethylammonium chloride | H$_2$O, room temp. | 42% | 15.06 |
| 3 | 50 | 3-(trimethoxysilyl)propyloctadecyl-dimethylammonium chloride | Toluene, reflux, stochiometric H$_2$O | 42% | 15.06 |
| 4 | 50 | 3-(trimethoxysilyl)propyloctadecyl-dimethylammonium chloride | Toluene, IPA, reflux | 42% | 15.06 |
| 5 | 50 | 3-(trimethoxysilyl)propyloctadecyl-dimethylammonium chloride | Toluene, IPA, reflux, stochiometric H$_2$O at end | 42% | 15.06 |
| 6 | 50 | 3-(trimethoxysilyl)propyloctadecyl-dimethylammonium chloride | Toluene, IPA, reflux | 42% | 7.03 |
| 7 | 50 | 3-(trimethoxysilyl)-2-(p,m-chloromethyl)-phenylethane | Toluene, IPA, reflux | 90% | 1.47 |
| 8 | 50 | 3-(trimethoxysilyl)-2-(p,m-chloromethyl)-phenylethane | Toluene, IPA, reflux | 90% | 4.33 |
| 9 | 50 | 3-(N-styrylmethyl-2-aminoethylamino)-propyltrimethoxysilane hydrochloride | Toluene, IPA, reflux | 32% | 13.30 |
| 10 | 50 | 3-(N-styrylmethyl-2-aminoethylamino)-propyltrimethoxysilane hydrochloride | Toluene, IPA, reflux | 32% | 4.99 |
| 11 | 50 | N-trimethoxysilylpropyl-N,N,N-trimethylammonium chloride | Toluene, IPA, reflux | 50% | 7.32 |
| 12 | 50 | N-trimethoxysilylpropyl-N,N,N-trimethylammonium chloride | Toluene, IPA, reflux | 50% | 2.49 |
| 13 | 50 | 3-(N-styrylmethyl-2-aminoethylamino)-propyltrimethoxysilane hydrochloride | Toluene, IPA, reflux | 40% | 6.69 |
| 14 | 50 | 3-(N-styrylmethyl-2-aminoethylamino)-propyltrimethoxysilane hydrochloride | Toluene, IPA, reflux | 40% | 19.67 |
| 17 | 100 | 3-aminopropyltrimethoxysilane | Toluene, IPA, reflux | 100% | 7.52 |
| 18 | 100 | 3-aminopropyltrimethoxysilane | Toluene, IPA, reflux | 100% | 2.56 |
| 19 | 100 | N-(2-aminoethyl)-3-aminopropyltrimethoxysilane | Toluene, IPA, reflux | 97% | 9.62 |
| 20 | 100 | N-(2-aminoethyl)-3-aminopropyltrimethoxysilane | Toluene, IPA, reflux | 97% | 3.27 |
| 21 | 50 | Phenyldimethylethoxysilane | Toluene, IPA, reflux | 100% | 1.82 |
| 22 | 50 | Phenyldimethylethoxysilane | Toluene, IPA, reflux | 100% | 0.76 |
| 23 | 50 | 3-(trimethoxysilyl)propyl methacrylate | Toluene, IPA, reflux | 98% | 7.66 |
| 24 | 50 | N-(triethoxysilylpropyl)urea | Toluene, IPA, reflux | 49% | 5.44 |
| 25 | 50 | Trimethoxysilylpropyldiethylenetriamine | Toluene, IPA, reflux | 98% | 2.73 |
| 26 | 50 | Bis(2-hydroxyethyl)-3-aminopropyltriethoxysilane | Toluene, IPA, reflux | 58% | 4.96 |
| 27 | 50 | N-[3-(triethoxysilyl)propyl]imidazole | Toluene, IPA, reflux | 96% | 2.88 |

Example 2

Preparation of Different Types of Treated Silica Filter Media

Additional substrates, namely high carbon rice hull ash, different types of ultra pure diatomaceous earth (Celpure P1000, Celpure P65), Celite 545 (standard diatomaceous earth filter aid), Perlite, and LRA II (a non-silica based lipid adsorbent) were used. Table 2 summarizes the treatment conditions and compositions of these samples.

TABLE 2

Compositions and conditions of treatments of different substrates

| Sample # | Substrate Media Type | Silica Amount g | Treatment Type | Treatment Condition | Silane Purity % | Loading (X Monolayer coverage) | Added Silane g |
|---|---|---|---|---|---|---|---|
| 28 | AgriSilicas STD | 150 | AEAPTMS (A 0700) | Toluene, IPA, reflux | 97% | 150% | 10.53 |
| 29 | Celpure P1000 | 100 | AEAPTMS (A 0700) | Toluene, IPA, reflux | 97% | 180% | 0.51 |
| 30 | Celpure P1000 | 50 | AEAPTMS (A 0700) | Toluene, IPA, reflux | 97% | 1070% | 1.53 |
| 31 | Celpure P1000 | 50 | Z-6032 (SMAEAPTMS) | Toluene, IPA, reflux | 32% | 200% | 1.46 |
| 32 | Perlite | 50 | AEAPTMS (A 0700) | Toluene, IPA, reflux | 97% | 200% | 0.24 |

TABLE 2-continued

Compositions and conditions of treatments of different substrates

| Sample # | Substrate Media Type | Silica Amount g | Treatment Type | Treatment Condition | Silane Purity % | Loading (X Monolayer coverage) | Added Silane g |
|---|---|---|---|---|---|---|---|
| 33 | Perlite | 50 | Z-6032 (SMAEAPTMS) | Toluene, IPA, reflux | 32% | 200% | 1.21 |
| 34 | Celite 545 | 50 | AEAPTMS (A 0700) | Toluene, IPA, reflux | 97% | 200% | 0.40 |
| 35 | Celite 545 | 50 | Z-6032 (SMAEAPTMS) | Toluene, IPA, reflux | 32% | 200% | 2.05 |
| 36 | Celpure P65 | 50 | AEAPTMS (A 0700) | Toluene, IPA, reflux | 97% | 200% | 0.61 |
| 37 | Celpure P65 | 50 | Z-6032 (SMAEAPTMS) | Toluene, IPA, reflux | 32% | 200% | 3.13 |
| 38 | LRA 11 | 50 | AEAPTMS (A 0700) | Toluene, IPA, reflux | 97% | 120% | 8.96 |
| 39 | LRA 11 | 50 | Z-6032 (SMAEAPTMS) | Toluene, IPA, reflux | 32% | 120% | 45.80 |

Z-6032: 3-(N-styrylmethyl-2-aminoethylamino)-propyltrimethoxysilane hydrochloride
AEAPTMS: N-(2-aminoethyl)-3-aminopropyltrimethoxysilane

Example 3

Two-Step Process to Synthesize Hydrophilic Quaternary Ammonium Functional Filter Aids (Filter Media Samples 40 and 42)

The treatment equipment was composed of a 500 milliliter, 3-neck round bottom reaction flask, a Teflon shaft mechanic stirrer, thermometer, condenser, and heating mantle around the flask. The reaction flask was loaded with 50 g of amino-functional pretreated RHA (sample 17 or 19) silica filter media, and 200 ml IPA solvent. The mixture was stirred for few minutes at ambient temperature, then the surface modification process involved addition of the proper amount of glycidyltrimethylammonium chloride (2.46 g for sample 17, or 2.02 g for sample 19) directly to the mixture in a slow addition rate, while good mixing was maintained. The reaction mixture was heated and refluxed under a $N_2$ blanket. After 4 hours stirring and refluxing, the treated slurry mixture was allowed to cool. Then it was transferred to a porcelain Büchner funnel outfitted with Whatman filter paper, and attached to a vacuum filter flask. The treated filter cake was filtered and washed four times with about 150 ml of DI water each time. Afterward, the sample was dried in the hood for about 24 hours. Next the treated silica filter media was transferred to a Pyrex container and covered with a paraffin film having a number of holes made with a syringe needle, and then the sample was vacuum oven dried at 60° C. for 2-4 hours. The dried samples were analyzed for surface area, pores structure, carbon-hydrogen-nitrogen content, $^{29}$Si NMR.

Example 4

Two-Step Process to Synthesize Hydrophilic Sulphonate-Functional Filter Aids (Filter Media Sample 41)

The treatment equipment was composed of a 500 milliliter, 3-neck round bottom reaction flask, a Teflon shaft mechanic stirrer, thermometer, condenser, and heating mantle around the flask. The reaction flask was loaded with 50 g of epoxy-functional pretreated RHA silica filter media (sample 15), and 200 ml IPA:$H_2O$ (5:1) solvent. The mixture was stirred for few minutes at ambient temperature, and the reaction mixture heated up to 70° C. under a $N_2$ blanket. The surface modification process involved addition of the mixture of 0.55 g of sodium metabisulfite, 0.07 g of sodium sulfite catalyst, and 5 g water from an additional funnel directly to the mixture in a slow addition rate over 1-2 hours, while good mixing was maintained. The temperature was then raised up to approximately 80° C., until the reaction completed. The reaction was monitored by iodometric titration of residual NaHSO$_3$. After approximately 22 hours stirring and refluxing, the treated slurry mixture was allowed to cool. Then it was transferred to a porcelain Büchner funnel outfitted with Whatman filter paper, and attached to a vacuum filter flask. The treated filter cake was filtered and washed four times with about 150 ml of DI water each time. Afterward, the sample was dried in the hood for about 24 hours. Next the treated filter aid was transferred to a Pyrex container and covered with a paraffin film having a number of holes made with a syringe needle, and then the sample was vacuum oven dried at 60° C. for 2-4 hours. The dried samples were analyzed for surface area, pores structure, carbon-hydrogen-nitrogen content, $^{29}$Si NMR. Table 3 summarizes compositions and conditions of the two-step processes.

TABLE 3

Compositions and conditions of treatments of two step processes.

| Sample # | Silica Amount g | 2nd Step Reactant | Treatment Condition | Silane Purity % | Added Silane g |
|---|---|---|---|---|---|
| 40 | 50 | Glycidyltrimethylammonium chloride | IPA, reflux | 75% | 2.02 |
| 41 | 50 | $Na_2S_2O_5/Na_2SO_3$ | IPA, water, reflux | 100% | 0.55/0.07 |
| 42 | 50 | Glycidyltrimethylammonium chloride | IPA, reflux | 75% | 2.46 |

Characterization of the Treated Silica Filter Media: Bet Surface Area, Pore Volume, Pore Diameter The surface area and porosity were measured using a Micrometrics® ASAP 2010 analyzer. Before analyses, the samples were degassed under vacuum at 150° C. until a constant pressure was achieved. In the analysis step, $N_2$ gas was adsorbed by the sample at 77° K and the surface area was calculated from the volume of adsorbate. BET parameters were acquired by integration of the BET equation using ASAP-2010 software. Surface area was calculated in the range of $0.05 \leq P/Po \leq 0.3$ from the adsorption branch of the isotherm. Barrett-Joyner-Halenda analysis was used to calculate the pore volume and pore diameter.

NMR

Identification of specific functional groups and molecular structure was determined by $^{29}Si$ solid-state NMR spectroscopy on a Unity Plus 400 MHz Spectrometer using a Varian VT CPMAS probe and a 7 mm motor.

Carbon-Hydrogen-Nitrogen (CHN)

CHN content was determined by combustion technique at Robertson Microlit Laboratories. From this analysis information, the treatment level on the surface was calculated.

Table 4 summarizes the characterization data of the treated silica samples.

TABLE 4

Characterization data summary of treated silica samples

| Sample # | Moisture content % | Surface Area m²/g | Pore Volume cm³/g | Pore Diameter Å | % C by Robertson Microlit | Ligand density μmol/m² | μmol/g |
|---|---|---|---|---|---|---|---|
| 1 | 2.63% | 8.69 | 0.047 | 149.54 | 5.69% | 23.73 | 206.16 |
| 2 | 4.43% | 11.58 | 0.060 | 142.22 | 5.58% | 17.47 | 202.17 |
| 3 | 2.05% | 17.85 | 0.077 | 98.42 | 5.12% | 10.39 | 185.51 |
| 4 | 1.60% | 22.51 | 0.097 | 97.05 | 3.11% | 4.61 | 103.67 |
| 5 | 1.43% | 23.45 | 0.098 | 93.15 | 2.96% | 4.57 | 107.25 |
| 6 | 1.89% | 24.53 | 0.104 | 94.57 | 2.47% | 3.36 | 82.33 |
| 7 | 1.57% | 32.65 | 0.128 | 99.68 | 0.84% | 1.95 | 63.64 |
| 8 | 2.60% | 33.66 | 0.129 | 99.64 | 1.01% | 2.27 | 76.52 |
| 9 | 2.20% | 22.98 | 0.101 | 105.52 | 2.19% | 4.96 | 114.06 |
| 10 | 1.46% | 29.32 | 0.118 | 96.80 | 1.32% | 2.35 | 68.75 |
| 11 | 1.33% | 30.24 | 0.124 | 100.45 | 1.67% | 5.75 | 173.96 |
| 12 | 1.44% | 22.39 | 0.103 | 112.07 | 0.88% | 4.09 | 91.67 |
| 13 | 1.59% | 28.19 | 0.112 | 95.47 | 2.09% | 3.86 | 108.85 |
| 14 | 1.77% | 18.76 | 0.077 | 101.39 | 2.98% | 8.27 | 155.21 |
| 17 | 2.71% | 28.02 | 0.100 | 97.28 | 1.36% | 8.09 | 226.67 |
| 18 | 0.86% | 30.48 | 0.118 | 100.00 | 0.72% | 3.94 | 120.00 |
| 19 | 1.49% | 23.64 | 0.101 | 101.93 | 1.68% | 8.46 | 200.00 |
| 20 | 1.75% | 28.15 | 0.118 | 98.55 | 1.03% | 4.36 | 122.62 |
| 21 | 1.44% | 32.32 | 0.131 | 102.99 | 0.42% | 1.35 | 43.75 |
| 22 | 2.47% | 32.28 | 0.133 | 104.50 | 0.23% | 0.74 | 23.96 |
| 23 | 0.80% | 29.80 | 0.120 | 97.08 | 0.98% | 3.04 | 90.74 |
| 24 | 1.05% | 28.99 | 0.119 | 100.14 | 0.80% | 2.87 | 83.33 |
| 25 | 2.06% | 27.02 | 0.117 | 100.15 | 1.14% | 3.91 | 105.56 |
| 26 | 0.96% | 31.75 | 0.128 | 100.93 | 0.74% | 1.77 | 56.06 |
| 27 | 1.63% | 31.06 | 0.129 | 102.94 | 0.62% | 1.66 | 51.67 |
| 28 | 2.90% | 16.11 | 0.023 | 215.71 | 0.82% | 6.06 | 97.62 |
| 29 | 0.33% | 2.18 | 0.002 | 106.61 | 0.09% | 4.92 | 10.71 |
| 31 | 0.04% | 2.39 | 0.003 | 140.36 | 0.46% | 10.02 | 23.96 |
| 33 | 5.68% | 3.07 | 0.003 | 148.64 | 0.57% | 9.66 | 29.69 |
| 34 | 0.48% | 1.47 | 0.002 | 104.07 | 0.16% | 12.94 | 19.05 |
| 35 | 0.05% | 2.11 | 0.002 | 139.39 | 0.22% | 5.42 | 11.46 |
| 37 | 0.94% | 5.66 | 0.014 | 145.31 | 0.39% | 3.59 | 20.31 |
| 39 | 5.31% | 112.73 | 0.741 | 222.48 | 8.71% | 4.02 | 453.65 |
| 40 | 2.77% | 21.82 | 0.099 | 105.43 | 1.82% | 5.35 | 116.67 |
| 41 | 2.69% | 29.02 | 0.114 | 98.12 | 0.99% | 3.55 | 103.13 |
| 42 | 1.91% | 26.17 | 0.109 | 102.99 | 1.41% | 4.08 | 106.82 |

Example 5

Compositions and Treatment Conditions of Silica Filters and their Characterization Table 5A-5D summarized additional compositions and treatment conditions of rice hull ash and their characterization.

TABLE 5A

| Filter Media Sample No | Treatment Type | Silica Type | Silica gram | First Additive Name | Gram | Second Additive Name | Gram | Reagent gram Glycidyltrimethyl-ammonium chloride | % C | Ligand Density μmol/m² |
|---|---|---|---|---|---|---|---|---|---|---|
| 43 | 3-(N-styrylmethyl-2-aminoethylamino)-propyltrimethoxy-silane hydrochloride | Producers RHA | 25 | 3-(N-styrylmethyl-2-aminoethylamino)-propyltrimethoxy-silane hydrochloride | 19.83 | | | | 5.61% | 25.68 |
| 44 | 3-(Trimethoxysilyl-propyl) isothiouronium chloride | Producers RHA | 25 | 3-(Trimethoxysilyl-propyl) isothiouronium chloride | 3.88 | | | | 1.06% | 11.34 |
| 45 | 3-(Trimethoxysilyl propyl) isothiouronium chloride | Producers RHA | 25 | 3-(Trimethoxysilylpropyl) isothiouronium chloride | 3.88 | | | | 1.67% | 18.27 |
| 46 | N-Octadecyldimethyl(3-Trimethoxysilyl propyl) ammonium chloride, then N-(Triethoxysilyl-propyl)-o-polyethylene oxide urethane | RiceSil 100 | 500 | N-Octadecyldimethyl(3-Trimethoxysilylpropyl) ammonium chloride | 93.29 | N-(Triethoxysilyl-propyl)-o-polyethylene oxide urethane | 4.12 | | 2.46% | 5.41 |
| 47 | 3-(N-styrylmethyl-2-aminoethylamino)-propyl trimethoxysilane hydrochloride, then N-(Triethoxysilylpropyl)-o-polyethylene oxide urethane | RiceSil 100 | 500 | 3-(N-styrylmethyl-2-aminoethylamino)-propyltrimethoxysilane hydrochloride | 92.66 | N-(Triethoxysilyl-propyl)-o-polyethylene oxide urethane | 3.12 | | 1.96% | 6.37 |
| 48 | 3-(N-styrylmethyl-2-aminoethylamino)-propyltrimethoxy-silane hydrochloride | RiceSil 100 | 500 | 3-(N-styrylmethyl-2-aminoethylamino)-propyltrimethoxy-silane hydrochloride | 185.33 | | | | 4.16% | 40.42 |
| 49 | 3-(Trimethoxysilyl-propyl) isothiouronium chloride | RiceSil 100 | 25 | 3-(Trimethoxysilyl-propyl) isothiouronium chloride | 3.88 | | | | 1.90% | 24.60 |
| 50 | N-(2-Aminoethyl)-3-amino-propyltri-methoxysilane, then Glycidyltrimethyl-ammonium chloride | RiceSil 100 | 500 | N-(2-Aminoethyl)-3-aminopropyltrimethoxy silane | 43.42 | | | 23.47 | 2.53% | 16.35 |
| 51 | 3-(Trihydroxysilyl-propyl-methylphosphonate) sodium salt | RiceSil 100 | 200 | 3-(Trihydroxysilylpropyl-methylphosphonate) sodium salt | 21.53 | | | | 1.00% | 6.75 |
| 52 | N-Octadecyldimethyl(3-Trimethoxysilylpropyl) ammonium chloride | RiceSil 100 | 500 | N-Octadecyldimethyl(3-Trimethoxysilylpropyl) ammonium chloride | 9.33 | | | | 0.68% | 0.90 |

TABLE 5A-continued

| | | | | Treatment Preparation | | | | Reagent gram | Results | |
|---|---|---|---|---|---|---|---|---|---|---|
| Filter Media Sample No | Treatment Type | Silica Type | Silica gram | First Additive Name | Gram | Second Additive Name | Gram | Glycidyltri-methyl-ammonium chloride | % C % | Ligand Density μmol/m² |
| 53 | N-(Trimethoxysilyl-propyl) ethylenediamine, triacetic acid, trisodium salt | RiceSil 100 | 500 | N-(Trimethoxysilylpropyl) ethylenediamine, triacetic acid, trisodium salt | 5.80 | | | | 1.50% | 12.53 |

TABLE 5B

| Sample # | Silica g | Silane Type | Treatment condition | Silane Purity % | Added Silane g | % C | Ligand Density |
|---|---|---|---|---|---|---|---|
| 54 | 500 | trimethoxysilylpropyl-ethylenediamine, triacetic acid, trisodium salt | Toluene, Reflux, H₂O | 45.0 | 72.46 | 1.86 | 4.79 |
| 55 | 500 | N-(triethoxysilylpropyl)-O-polyethylene oxide urethane | Toluene, Reflux, H₂O | 95.0 | 59.68 | 2.34 | 4.39 |
| 56 | 500 | Bis-(2-hydroxyethyl)-3-aminopropyltriethoxysilane | Toluene, Reflux, H₂O | 57.6 | 22.55 | 0.93 | 1.26 |
| 57 | 500 | ((chloromethyl)phenylethyl)trimethoxy silane | Toluene, Reflux, H₂O | 90.0 | 8.70 | 1.05 | 1.55 |
| 58 | 500 | N-(3-triethoxysilylpropyl)-gluconamide | Toluene, Reflux, H₂O | 50.0 | 31.64 | 1.12 | 2.1 |
| 59 | 500 | 3-mercaptopropyltriethoxysilane | Toluene, Reflux, H₂O | 95.0 | 9.95 | 0.81 | 3.59 |
| 60 | 500 | N-(triethoxysilylpropyl)-4-hydroxybutyramide | Toluene, Reflux, H₂O | 100.0 | 12.16 | 1.16 | 0.21 |
| 61 | 500 | 3-(triethoxysilyl)propylsuccinic anhydride | Toluene, Reflux, H₂O | 95.0 | 12.73 | 0.76 | 1.46 |
| 62 | 500 | Tris(3-trimethoxysilylpropyl)isocyanurate | Toluene, Reflux, H₂O | 95.0 | 34.18 | 1.28 | 2.13 |
| 63 | 500 | 2-Hydroxy-4-(3-triethoxysilylpropoxy)-diphenylketone | Toluene, Reflux, H₂O | 95.0 | 23.23 | 1.61 | 1.74 |
| 64 | 500 | Ureidopropyltrimethoxysilane | Toluene, Reflux, H₂O | 100.0 | 11.72 | 0.86 | 2.03 |
| 65 | 500 | 3-isocyanatopropyltriethoxysilane | Toluene, Reflux, H₂O | 95.0 | 6.90 | 0.81 | 5.31 |
| 66 | 500 | N-(3-trimethoxysilylpropyl)pyrrole | Toluene, Reflux, H₂O | 100.0 | 6.08 | 0.87 | 3.26 |
| 67 | 500 | Bis[(3-methyldimethoxysilyl)propyl]-polypropylene oxide | Toluene, Reflux, H₂O | 100.0 | 18.92 | 1.72 | 1.4 |

TABLE 5C

| Sample # | Silane Type | Treatment condition | RiceSil 100 Weight gram | Silane Purity % | Silane Weight gram | % C Robertson Microlit | Ligand Density Calculated umol/m2 |
|---|---|---|---|---|---|---|---|
| 68 | trimethoxysilylpropyl-ethylenediamine, triacetic acid, trisodium salt | Toluene, Reflux, H₂O | 500 | 45% | 24.20 | 1.08 | 1.27 |
| 69 | N-trimethoxysilylpropyl-N,N,N—Cl, trimethylammonium chloride | Toluene, Reflux, H₂O | 500 | 50% | 14.60 | 0.79 | 1.28 |
| 70 | 2-(4-chlorosulfonylphenyl)-ethyltrichlorosilane | Toluene, Reflux, H₂O | 500 | 50% | 24.20 | 1.28 | 2.89 |
| 71 | 3-(N-styrylmethyl-2-aminoethylamino)-propyltrimethoxysilane hydrochloride | Toluene, Reflux, H₂O | 500 | 32% | 46.30 | 1.65 | 4.69 |
| 72 | triethoxysilylpropylethyl-carbamate | Toluene, Reflux, H₂O | 500 | 100% | 12.35 | 1.01 | 1.60 |
| 73 | N-(triethoxysilylpropyl)-O-polyethylene oxide urethane | Toluene, Reflux, H₂O | 500 | 95% | 19.94 | 1.09 | 1.01 |

TABLE 5C-continued

| Sample # | Silane Type | Treatment condition | RiceSil 100 Weight gram | Silane Purity % | Silane Weight gram | % C Robertson Microlit | Ligand Density Calculated umol/m2 |
|---|---|---|---|---|---|---|---|
| 74 | 3-trihydrosilylpropylmethylphosphonate, sodium salt | Toluene, Reflux, H₂O | 500 | 42% | 22.45 | 0.83 | 2.82 |
| 75 | Bis-(2-hydroxyethyl)-3-aminopropyltriethoxysilane | Toluene, Reflux, H₂O | 500 | 58% | 22.55 | 0.93 | 1.26 |
| 76 | N-(3-triethoxysilylpropyl)-4,5-dihydroimidazole | Toluene, Reflux, H₂O | 500 | 96% | 12.06 | 1 | 1.57 |
| 77 | ((chloromethyl)phenylethyl)trimethoxysilane | Toluene, Reflux, H₂O | 500 | 90% | 8.70 | 1.05 | 1.55 |
| 78 | 3-aminopropyltrimethoxysilane, then N-(triethoxysilylpropyl)-O-polyethylene oxide urethane | Toluene, Reflux, H₂O | 500 | 81% 95% | 8.15 5.03 | 0.99 | 2.58 |
| 79 | 3-trihydrosilylpropylmethylphosphonate, sodium salt, then N-(triethoxysilylpropyl)-O-polyethylene oxide urethane | Toluene, Reflux, H₂O | 500 | 42% 95% | 16.87 5.02 | 0.77 | 2.43 |
| 80 | N-trimethoxysilylpropyl-N,N,N—Cl, trimethylammonium chloride, then (3-glycidoxypropyl)trimethoxysilane | Toluene, Reflux, H₂O | 500 | 50% 100% | 15.30 2.40 | 0.95 | 2.41 |
| 81 | 3-trihydrosilylpropylmethylphosphonate, sodium salt, then Bis-(2-hydroxyethyl)-3-aminopropyltriethoxysilane | Toluene, Reflux, H₂O | 500 | 42% 58% | 16.90 5.31 | 0.98 | 3.81 |
| 82 | 3-(N-styrylmethyl-2-aminoethylamino)-propyltrimethoxysilane hydrochloride, then N-(triethoxysilylpropyl)-O-polyethylene oxide urethane | Toluene, Reflux, H₂O | 500 | 32% 95% | 34.76 5.04 | 1.72 | 4.95 |
| 83 | 2-(trimethoxysilylethyl)pyridine | Toluene, Reflux, H₂O | 500 | 100% | 9.01 | 1.17 | 2.89 |
| 84 | N-(3-triethoxysilylpropyl)-gluconamide | Toluene, Reflux, H₂O | 500 | 50% | 31.64 | 1.12 | 2.10 |
| 85 | 2-(trimethoxysilylethyl)pyridine, then N-(3-triethoxysilylpropyl)-gluconamide | Toluene, Reflux, H₂O | 500 | 100% 50% | 6.74 7.90 | 1.04 | 2.40 |
| 86 | 3-mercaptopropyltriethoxysilane | Toluene, Reflux, H₂O | 500 | 95% | 9.95 | 0.81 | 3.59 |
| 87 | N-trimethoxysilylpropyl-N,N,N—Cl, trimethylammonium chloride, then N-(3-triethoxysilylpropyl)-gluconamide | Toluene, Reflux, H₂O | 500 | 50% 50% | 15.30 7.95 | 0.98 | 2.54 |
| 88 | N-(triethoxysilylpropyl)-4-hydroxybutyramide | Toluene, Reflux, H₂O | 500 | 100% | 12.16 | 1.16 | 0.21 |
| 89 | 3-(triethoxysilyl)propylsuccinic anhydride | Toluene, Reflux, H₂O | 500 | 95% | 12.73 | 0.78 | 1.42 |
| 90 | Trimethoxysilylpropyl polyethyleneimine | Toluene, Reflux, H₂O | 50 | 50% | 1.00 | 1.04 | 1.43 |
| 91 | Tris(3-trimethoxysilylpropyl)isocyanurate | Toluene, Reflux, H₂O | 500 | 95% | 34.18 | 1.28 | 1.60 |
| 92 | 2-Hydroxy-4-(3-triethoxysilylpropoxy)-diphenylketone | Toluene, Reflux, H₂O | 500 | 95% | 23.23 | 1.61 | 1.74 |
| 93 | Ureidopropyltrimethoxysilane | Toluene, Reflux, H₂O | 500 | 100% | 11.72 | 0.86 | 2.03 |
| 94 | O-(propargyloxy)-N-(triethoxysilylpropyl)urethane | Toluene, Reflux, H₂O | 500 | 90% | 17.77 | 1.04 | 1.84 |
| 95 | 3-(trimethoxysilyl)propyloctadecyldimethylammonium chloride | Toluene, Reflux, H₂O | 500 | 42% | 9.33 | 0.21 | 0.24 |
| 96 | N-1-phenylethyl-N'-triethoxysilylpropylurea | Toluene, Reflux, H₂O | 500 | 100% | 9.70 | 1.02 | 2.43 |
| 97 | 3-isocyanatopropyltriethoxysilane | Toluene, Reflux, H₂O | 500 | 95% | 6.90 | 0.81 | 5.31 |
| 98 | 2-(3,4-epoxycyclohexyl)ethyltrimethoxysilane | Toluene, Reflux, H₂O | 500 | 97% | 6.90 | 0.98 | 3.22 |
| 99 | N-(3-trimethoxysilylpropyl)pyrrole | Toluene, Reflux, H₂O | 500 | 100% | 6.08 | 0.87 | 3.26 |

TABLE 5C-continued

| Sample # | Silane Type | Treatment condition | RiceSil 100 Weight gram | Silane Purity % | Silane Weight gram | % C Robertson Microlit | Ligand Density Calculated umol/m2 |
|---|---|---|---|---|---|---|---|
| 100 | Bis[(3-methyldimethoxysilyl)propyl]-polypropylene oxide | Toluene, Reflux, $H_2O$ | 500 | 100% | 18.96 | 1.07 | 1.40 |
| 101 | N-trimethoxysilylpropyl-N,N,N—Cl, trimethylammonium chloride, then 2-Hydroxy-4-(3-triethoxysilylpropoxy)-diphenylketone | Toluene, Reflux, $H_2O$ | 500 | 50% 95% | 10.34 3.12 | 0.84 | 3.67 |
| 102 | Trimethoxysilylpropylisothiouronium chloride | Toluene, Reflux, $H_2O$ | 500 | 43% | 15.55 | 0.71 | 0.44 |
| 103 | (3-glycidoxypropyl)trimethoxysilane | Toluene, Reflux, $H_2O$ | 500 | 100% | 6.23 | 0.74 | 0.35 |
| 104 | 3-mercaptopropyltriethoxysilane, then N-(triethoxysilylpropyl)-O-polyethylene oxide urethane | Toluene, Reflux, $H_2O$ | 500 | 95% 95% | 4.98 3.38 | 0.79 | 1.14 |
| 105 | 3-(triethoxysilyl)propylsuccinic anhydride, then N-(triethoxysilylpropyl)-O-polyethylene oxide urethane | Toluene, Reflux, $H_2O$ | 500 | 95% 95% | 6.36 3.40 | 0.94 | 1.05 |
| 106 | trimethoxysilylpropyl-ethylenediamine, triacetic acid, trisodium salt, then N-(triethoxysilylpropyl)-O-polyethylene oxide urethane | Toluene, Reflux, $H_2O$ | 500 | 45% 95% | 20.35 3.45 | 1.16 | 1.64 |
| 107 | 2-(4-chlorosulfonylphenyl)-ethyltrichlorosilane, then N-(triethoxysilylpropyl)-O-polyethylene oxide urethane | Toluene, Reflux, $H_2O$ | 500 | 50% 95% | 13.40 3.40 | 0.93 | 0.89 |
| 108 | 2-(4-chlorosulfonylphenyl)-ethyltrichlorosilane, then Bis-(2-hydroxyethyl)-3-aminopropyltriethoxysilane | Toluene, Reflux, $H_2O$ | 500 | 50% 58% | 15.30 5.32 | 1.01 | 1.15 |

Ligand densities are corrected for 0.43% C due to residual carbon on the original rice hull ash. Mixed silanes sample ligand density are based on first silane.

TABLE 5D

| Sample # | Silane Treatment | Gram Silica | Gram Silane | Purity Silane | % C on Treated Silica | Ligand Density μmol/m2 | Treatment Conditions |
|---|---|---|---|---|---|---|---|
| 109 | 75% N-trimethoxysilylpropyl-N,N,N-trimethylammonium chloride + 25% Bis(2-hydroxyethyl)-3-aminopropyltriethoxysilane. | 500 | 15.29 first agent, 6.12 second agent | 50% first agent, 58% second agent | 1.01 | 4.01 | Toluene, Reflux, $H_2O$ |
| 110 | n-Octadecyltriethoxysilane | 500 | 10.99 | 100% | 0.86% | 3.41 | Toluene, Reflux, H2O |
| 111 | n-Octyltriethoxysilane | 500 | 7.29 | 100% | 0.69% | 2.74 | Toluene, Reflux, H2O |
| 112 | Phenyltriethoxysilane | 500 | 6.34 | 100% | 0.41% | 1.65 | Toluene, Reflux, H2O |

Example 6

Test of Antimicrobial Activity (*Bacillus subtilis*)

Microorganism tested: *Bacillus subtilis*
Filter media tested: filter media samples 43, 44, 4 and FW12 (untreated diatomaceous earth)
Protocol:
  *Bacillus subtilis* fermentation broth was diluted in sterile PBS to ~$10^4$ CFU/mL (1 OD≈$5*10^8$ CFU/mL was used to estimate CFU/mL in fermentation broth)
  Use 0.5 g filter media/5 mL liquid (10% solid)
1. Serial dilutions (made in sterile 0.9% w/v NaCl) of the diluted broth sample were plated on LA plates to determine actual CFU/mL used. Plates were incubated over night at 34° C.
2. Filter media and diluted bacterial sample (or PBS control) were mixed in a sterile 125 mL baffled flask for 2½ hours at 30° C., 200 rpm.
3. Liquid part of the treated samples (2) were plated on LA plates (5 plates for each sample, one plate for control) and incubated overnight at 34° C.
4. The plates were counted for bacteria.

Results:

The results are summarized in Table 6. By mixing the bacteria with filter media samples 4 and 44, the CFUs were reduced, which indicates that filter media samples 4 and 44 had anti-microbial activity and killed the bacteria by contacting.

TABLE 6

| Sample | CFU/mL |
|---|---|
| Diluted broth - start | $6.53 * 10^3 \pm 2.47 * 10^3$ |
| Sample 43 + bacteria - mixing | $1.04 * 10^4 \pm 1.50 * 10^3$ |
| Sample 44 + bacteria - mixing | $1.30 * 10^2 \pm 3.00 * 10^1$ |
| Sample 4 + bacteria - mixing | TFTC |
| FW12 + bacteria - mixing | $5.90 * 10^4 \pm 8.00 * 10^3$ |
| Diluted broth sample - mixing | $1.05 * 10^3 \pm 5.00 * 10^1$ |

Notes and Abbreviations:
PBS: Phosphate buffered saline (prevents cells from lysing due to osmotic chock)
CFU: colony forming units (a measure of viable cells)
TFTC: Too Few To Count
The CFU/mL are reported as: Average ± Difference (number of plates) [the difference is between the average and the observations farthest from the average].
Only plates with between 20-300 colonies were counted.

Example 7

Test of Antimicrobial Activity (*Bacillus subtilis*)

Microorganism tested: *Bacillus subtilis*
Filter Media tested: filter media samples 1, 4, 6, 44, and 45.
Protocol:
 *Bacillus subtilis* fermentation broth was diluted in sterile PBS to ~$10^4$ CFU/mL.
 0.5 g filter media/5 mL liquid (10% solid) was used.
1. Serial dilutions (made in sterile 0.9% w/v NaCl) of the diluted broth sample were plated on LA plates to determine actual CFU/mL used. Plates were incubated over night at 34° C.
2. Filter media and diluted bacterial sample (15 mL liquid) were mixed in a sterile 250 μL baffled flask. 2 flasks were used for each filter media.
 (A flask with PBS instead of bacterial sample was included for the following filter media: Samples 1, 6 and 45)
3. The above was mixed for 2 hours at 30° C., 250 rpm.
4. Treated samples (the liquid part) were plated on LA plates (4 or 5 plates for each sample). Plates were incubated overnight at 34° C.
5. The plates were counted for bacteria.

Results:
The results are summarized in Table 7. By mixing the bacteria with filter media samples 1, 4, 6, 44, and 45, the CFUs were significantly reduced.

TABLE 7

| Sample | | CFU/mL |
|---|---|---|
| Diluted broth - start | | $3.45 * 10^4 \pm 4.50 * 10^3$ |
| Diluted broth - mixing | | $1.72 * 10^4 \pm 1.55 * 10^3$ |
| Sample 1 | A | TFTC |
| | B | TFTC |
| Sample 4 | A | TFTC |
| | B | TFTC |
| Sample 6 | A | TFTC |
| | B | $1.00 * 10^2 \pm 0.00 * 10^0$ |
| Sample 44 | A | $3.10 * 10^2 \pm 9.00 * 10^1$ |
| | B | $6.00 * 10^2$ |
| Sample 45 | A | TFTC |
| | B | TFTC |

Example 8

Test of Antimicrobial Activity and Filtration (*Lactobacillus brevis*)

Microorganism tested: *Lactobacillus brevis*
Filter media tested: Samples 4, 43, 45 & FW12.
Used 0.5 g filter media/5 mL culture (10% solid).

Protocol:
1. A *Lactobacillus brevis* overnight culture was diluted to ~$10^5$ CFU/mL (based on 1 $OD_{600} \approx 2.7*10^8$ CFU/mL) in two steps—the first dilution was made in sterile *Lactobacillus* MRS broth, the second in sterile PBS.
2. Serial dilutions (in 0.9% w/v NaCl) of the culture were made (second dilution).
3. Diluted samples were plated on *Lactobacillus* MRS broth plates, to determine actual starting CFU/mL.
4. Filter media and diluted bacterial sample (10 mL liquid) were mixed in a sterile 125 mL baffled flask, sealed with Parafilm®, for 2 hours 15 minutes at room temperature on an orbit shaker (~60 rpm).
5. Serial dilutions (in 0.9% w/v NaCl) were made of treated sample and plated on *Lactobacillus* MRS broth plates.
6. Selected samples/dilutions of samples 4, 43 and 45 were filtered through a 5 μm filter.
7. The filtered samples were plated on *Lactobacillus brevis* broth plates, and incubated in a candle jar at 30° C. for 2 days.
8. The plates were counted.

Results:
The results are summarized in Table 8. CFUs were reduced by mixing Samples 4, 43, and 45 with bacteria. CFUs were further reduced by filtering the mixture through a 5 μm filter.

TABLE 8

| Sample | CFU/mL |
|---|---|
| *Lactobacillus brevis* culture - start | $1.05 * 10^5 \pm 2.50 * 10^3$ |
| *Lactobacillus brevis* culture - mixing | $1.23 * 10^5 \pm 2.50 * 10^3$ |
| Sample 4 (mixing) | $3.22 * 10^4 \pm 4.77 * 10^3$ |
| Sample 43 (mixing) | $3.43 * 10^4 \pm 5.67 * 10^3$ |
| Sample 45 (mixing) | $5.55 * 10^2 \pm 4.50 * 10^1$ |
| FW12 (DE) | $8.60 * 10^4 \pm 4.75 * 10^3$ |
| Filtered Sample 4 | TFTC |
| Filtered Sample 43 | TFTC |
| Filtered Sample 45 | TFTC |

Example 9

Test of Antimicrobial Activity (*E. coli*)

Microorganism tested: *E. coli* (MG1655)
Filter media tested: FW12, samples 43, 1, 4, 6, 44 and 45.
Protocol:
0.5 g Filter Media/5 mL Feed (=10% solid).
1. An *E. coli* culture (not yet in stationary phase) was diluted to ~$10^5$ CFU/mL (based on 1 $OD_{600} \approx 5*10^8$ CFU/mL) in two steps—the first dilution was made in sterile LB media, the second in sterile PBS (this was the Feed).
2. Serial dilutions (in 0.9% w/v NaCl) of the Feed were made.
3. 100 μL of the diluted feed samples were plated on LA plates, to determine the actual starting CFU/mL.
4. Filter media and 10 mL feed were mixed in a sterile 125 mL baffled flask for 2 hours at 25° C., 200 rpm (¾ inch stroke).
5. Serial dilutions (in 0.9% w/v NaCl) of mixed samples were made and 100 μl of each was plated on LA plates, and incubated overnight at 30° C.
6. Plates were counted.

Results:
The results are summarized in Table 9.

TABLE 9

| Sample | CFU/mL |
| --- | --- |
| MG1655 - start | $6.80 * 10^4 \pm 4.00 * 10^3$ |
| MG1655 - mixing | $5.35 * 10^5 \pm 2.50 * 10^4$ |
| diatomaceous earth | $2.28 * 10^5 \pm 1.72 * 10^5$ |
| Sample 43 | $9.05 * 10^3 \pm 5.50 * 10^2$ |
| Sample 1 | $1.28 * 10^3 \pm 2.45 * 10^2$ |
| Sample 4 | $1.73 * 10^4 \pm 2.03 * 10^3$ |
| Sample 6 | TFTC |
| Sample 44 | $2.70 * 10^3 \pm 1.23 * 10^2$ |
| Sample 45 | $5.20 * 10^3 \pm 2.00 * 10^2$ |

Example 10

Test of Antimicrobial Activity and Filtration (*Lactobacillus brevis*)

Microorganism tested: *Lactobacillus brevis* type strain (ATCC#14869)
Filter media tested: Samples 43, 4, and 44
Protocol:
0.5 g Filter media/5 mL Feed (=10% solid)
1. A *Lactobacillus brevis* culture was diluted to ~$10^5$ CFU/mL (based on 1 $OD_{600}$ $2.7*10^8$ CFU/mL) in two steps—the first dilution was made in sterile *Lactobacillus* MRS broth, the second in sterile PBS (this was the Feed).
2. Serial dilutions (in 0.9% w/v NaCl) of the Feed were made.
3. 100 μL of the diluted samples were plated on *Lactobacillus* MRS broth plates, to determine the actual starting CFU/mL.
4. Filter media and 5 mL Feed were mixed in a sterile 15 mL conical tube for 2 hours at 25° C., 250 rpm (½ inch stroke).
5. Serial dilutions (in 0.9% w/v NaCl) of mixed samples were made and plated on *Lactobacillus* MRS broth plates (100 μl each).
6. All samples were filtered through 5 μm syringe filter.
7. Serial dilutions (in 0.9% w/v NaCl) of filtered samples were made and plated on *Lactobacillus* MRS broth plates.
8. Plates were counted in a candle jar at 30° C. for 2 days.
9. Plates were counted.
Results:
The results are summarized in Table 17. CFUs were reduced by mixing Samples 4, 43, and 44 with bacteria. CFUs were further reduced by filtering the mixture through a 5 μM filter.

TABLE 10

| Sample | CFU/mL | CFU/mL (filtered) |
| --- | --- | --- |
| ATCC#14869 - start | $2.83 * 10^4 \pm 4.67 * 10^3$ | |
| ATCC#14869 - mixing | $4.00 * 10^4 \pm 2.00 * 10^3$ | $1.27 * 10^4 \pm 5.80 * 10^2$ |
| Sample 43 | $4.55 * 10^3 \pm 3.50 * 10^2$ | $2.40 * 10^3 \pm 2.00 * 10^2$ |
| Sample 4 | $1.95 * 10^2 \pm 5.00 * 10^0$ | TFTC |
| Sample 44 | $8.10 * 10^2 \pm 1.40 * 10^2$ | $5.50 * 10^1 \pm 5.00 * 10^0$ |

Example 11

Test of Antimicrobial Activity (*Lactobacillus brevis*)

Microorganism tested: *Lactobacillus brevis*
Filter media tested: Samples 48, 50, 51, and 52.

Protocol:
1. *Lactobacillus brevis* (gram positive) culture was streaked on MRS agar and incubated anaerobically at 26° C. until growth was sufficient.
2. Working inoculum was prepared by diluting colonies from the MRS plates into 0.1% peptone, targeting 5×104 cfu/mL.
3. 0.5 g filter media was added to 10 mL inoculum in a 30 mL glass tube (5%).
4. The glass tube was sealed and incubated at room temperature for 30 minutes with mixing (8 inversions/minute).
5. Serial dilutions of 1:10 were prepared in 0.9% NaCl and plated with MRS agar, using the pour plate method to enumerate bacterial population.
6. Plates were incubated at 26° C., anaerobically (GasPak), until growth was sufficient to count.
7. Plates that had 20-200 colonies were counted. The Results are summarized in Table 11.

Example 12

Test of Antimicrobial Activity (*Acetobacter pasteurianus* (Gram Negative))

Microorganism tested: *Acetobacter pasteurianus* (gram negative)
Filter media tested: Samples 48, 50, 51, and 52.
Protocol:
1. *Acetobacter pasteurianus* (gram negative) culture was streaked onto MRS agar and incubated aerobically at 27° C. until growth was sufficient.
2. Culture was stocked by adding 1 mL loop of agar plate colonies to 99 mL of MRS broth and incubated at 27° C.
3. Working inoculum was made by diluting an aliquot of the MRS stock culture into either phosphate buffered saline (PBS) or 0.1% peptone.
4. 0.5 g of filter media was added to 10 mL inoculum in a 30 mL glass tube.
5. The glass tube was sealed and incubated at room temperature for 30 minutes with mixing (8 inversions/minute).
6. Serial dilutions of 1:10 were performed in 0.1% peptone and plated with MRS agar, using the pour plate method to enumerate bacterial population.
7. Plates were counted at 27° C., aerobically, until growth was sufficient to count.
8. Plates that had 20-200 colonies were counted. The Results are summarized in Table 11.

Example 13

Test of Antimicrobial Activity (*Saccharomyces diastaticus* (Yeast))

Microorganism tested: *Saccharomyces diastaticus* (yeast)
Filter media tested: Samples 48, 50, and 51,
Protocol:
1. *Saccharomyces diastaticus* (yeast) culture was streaked onto YM agar and incubated aerobically at 30° C. until growth was sufficient.
2. Working inoculum was prepared by diluting colonies from the YM plates into phosphate buffered saline (PBS), targeting 3×104 cfu/mL.
3. 0.5 g to filter media was added to 10 mL inoculum in a 30 mL glass tube.
4. The glass tube was sealed and incubated at room temperature for 30 minutes with mixing (8 inversions/minute).

5. Serial dilutions of 1:10 were performed in 0.9% NaCl and plated with MRS agar, using the pour plate method to enumerate bacterial population.
6. Plates were incubated at 30° C., aerobically, until growth was sufficient to count.
7. Plates that had 20-200 colonies were counted. The Results are summarized in Table 11.

TABLE 11

| Sample No. | Treatment | Silica Type | Lactobacillus Brevis, grams positive (+) % Reduction | Acetobacter pasteurinus, gram negative (−) % Reduction | Saccharomyces distaticus, yeast % Reduction |
|---|---|---|---|---|---|
| 48 | 3-(N-styrylmethyl-2-aminoethylamino)-propyltrimethoxy-silane hydrochloride | RiceSil 100 | 100% | 18% | 41% |
| 51 | 3-trihydroxysilylpropyl-methyl phosphonate, sodium salt | RiceSil 100 | 20% | 10% | 33% |
| 50 | N-(2-Aminoethyl)-3-aminopropyltrimethoxy-silane Glycidyltrimethyl-ammonium chloride | RiceSil 100 | 90% | 20% | 3% |
| 52 | N-Octadecyldimethyl(3-Trimethoxysilylpropyl) ammonium chloride | RiceSil 100 | 100% | 90% | |

Example 14

Removal of Trans-2-nonenal from Beer Spiked at 20 ppm

The beer used was Belk's ESB (Extra Special Bitter) Ale, manufactured by Anderson Valley Brewing Company and distributed by Opperman's Cork'N'Ale, Saginaw.

The following gan chromatography (GC) conditions were used in Examples 14-17 unless otherwise noted.

Conditions: GC2B (Agilent 6890); oven: 50(1)-250(8) at 20° C./min then to 300(5) at 30° C./min; column: DB-1 30 m×0.25 mm×0.25 micron, CF=2.5 mL/min, hydrogen carrier gas, vel=62 cm/sec at 50° C.; inlet: 270° C., pressure=13.3 at 50° C., 50:1 split; detector: FID, 300° C., H2=30 mL/min, air=400 mL/min, makeup(He)=25 mL/min; signal: zero=0, range=0, attn=0; injection volume=1 uL.

1. Decarbonation of Beer (ASBC Method Beer, 1D)
   10 μL of tributyl phosphate was placed in a 500-mL Erlenmeyer flask. Beer was poured to the 250 mL mark. Another 10 μL of tributyl phosphate was added to the flask. The mouth of the flask was covered with aluminum foil, with a one-cm diameter hole in the center, and allowed to incubate for 12 minutes at 190 rpm, 30° C. Beer was transferred to a screw top bottle.

2. Preparation of 20 ppm Trans-2-Nonenal Solution
   One gram of trans-2-nonenal was mixed with 100 mL of the decarbonated beer in a 100 mL volumetric flask. Then one mL of the solution was removed and diluted 1:10 with decarbonated beer in a 10 mL volumetric flask. Then one mL of the solution in the 10 mL flask was removed and diluted 1:50 with decarbonated beer in a 50 mL volumetric flask. The final solution contained 20 ppm of trans-2-nonenal.

3. Removal of Trans-2-Nonenal
   In a 10 mL vial, 0.05 gm of a treated silica filter media sample and 1 mL of the above 20 ppm trans-2-nonenal solution were added. The vial was covered and shaken for 15 minutes at room temperature using a Vortex mixer set to a speed of 10. Then the mixture was removed from the vial using a pipette and placed in an Autovial NP 0.45% PTFE filter (2 mL capacity). The mixture was filtered and the filtrate was collected in a 10 mL vial. The trans-2-nonenal content in the filtrate was analyzed by GC (gas chromatography). The % removal of trans-2-nonenal by each treated silica filter media sample is shown in Table 12.

TABLE 12

| sample No. | Amount Silica gm | % T2N Removed |
|---|---|---|
| 70 | 0.0509 | 23 |
| 107 | 0.0514 | 54% |
| 73 | 0.0504 | 68% |
| 75 | 0.0502 | 66% |
| 69 | 0.0519 | 73% |
| 68 | 0.0517 | 79% |
| 106 | 0.0519 | 46% |
| 109 | 0.0520 | 54% |
| 71 | 0.0504 | 89% |

Example 15

Removal of Trans-2-Nonenal from Beer Spiked at 25 ppm

1. Decarbonation of Beer (ASBC Method Beer, 1D)
   The beer was decarbonated according to Example 14.

2. Preparation of 25 ppm Trans-2-Nonenal Solution
   0.25 grams of trans-2-nonenal was mixed with 100 mL of the decarbonated beer in a 100 mL volumetric flask. Then one mL of the solution was removed and diluted 1:100 with decarbonated beer in another 100 mL volumetric flask. The final solution contained 25 ppm of trans-2-nonenal.

3. Removal of Trans-2-Nonenal
   In a 10 mL vial, 0.05 gm of a treated silica filter media sample and 1 mL of the above 25 ppm trans-2-nonenal solution were added. The vial was covered and shaken for 15 minutes at room temperature using a Vortex mixer set to a speed of 10. Then the mixture was removed from vial using a pipette and placed in an Autovial NP 0.45μ PTFE filter (2 mL capacity). The mixture was filtered and the filtrate was collected in a 10 mL vial. The trans-2-nonenal content in the filtrate was analyzed by GC (gas chromatography). The % removal of trans-2-nonenal by each treated silica filter media sample is shown in Table 13.

TABLE 13

| Sample No. | Amount Silica gm | % T2N Removed |
|---|---|---|
| 110 | 0.051 | 66% |
| 111 | 0.052 | 32% |
| 112 | 0.052 | 65% |

Example 16

Removal of Diacetyl from Beer Spiked at 100 ppm

1. Decarbonation of Beer (ASBC Method Beer, 1D)
   The beer was decarbonated according to Example 14.
2. Preparation of 100 ppm Diacetyl Solution
   One gram of diacetyl was mixed with 100 mL of the decarbonated beer in a 100 mL volumetric flask. Then one mL of the solution was removed and diluted 1:10 with decarbonated beer in a 10 mL volumetric flask. Then one mL of the solution in the 10 mL flask was removed and diluted 1:10 with decarbonated beer in a 10 mL volumetric flask. The final solution contained 100 ppm Diacetyl.
3. Removal of Diacetyl
   In a 10 mL vial, 0.05 gm of a treated silica filter media sample and 1 mL of the above 100 ppm diacetyl solution were added. The vial was covered and shaken for 15 minutes at room temperature using a Vortex mixer set to a speed of 10. Then the mixture was removed from vial using a pipette and placed in an Autovial NP 0.45μ PTFE filter (2 mL capacity). The mixture was pushed through filter and the filtrate was collected in a 10 mL vial. The diacetyl content in the filtrate was analyzed by GC (gas chromatography). The % removal of diacetyl by each treated silica filter media sample is shown in Table 14.

TABLE 14

| Sample No. | Amount Silica (gm) | % Diacetyl Removed |
|---|---|---|
| 109 | 0.0496 | 34% |
| 106 | 0.0518 | 5% |
| 69 | 0.051 | 14% |
| 71 | 0.052 | 12% |

Example 17

Removal of Linoleic Acid from Beer Spiked at 100 ppm

1. Decarbonation of Beer
   The beer was decarbonated according to Example 14.
2. Preparation of 100 ppm Linoleic Acid solution
   One gram of linoleic acid was mixed with 100 mL of the decarbonated beer in a 100 mL volumetric flask. Then one mL of the solution was removed and diluted 1:10 with decarbonated beer in a 10 mL volumetric flask. Then one mL of the solution in the 10 mL flask was removed and diluted 1:10 with decarbonated beer in a 10 mL volumetric flask. The final solution contains 100 ppm linoleic acid.
3. Removal of Linoleic Acid
   In a 10 mL vial, 0.05 gm of a treated silica filter media sample and 1 mL of the above 100 ppm linoleic acid solution were added. The vial was covered and shaken for 15 minutes at room temperature using a Vortex mixer set to a speed of 10. Then the mixture was removed from vial using a pipette and placed in an Autovial NP 0.45μ PTFE filter (2 mL capacity). The mixture was pushed through filter and the filtrate was collected in a 10 mL vial. The linoleic acid content in the filtrate was analyzed by GC (gas chromatography). The % removal of linoleic acid by each treated silica filter media sample is shown in Table 15.

TABLE 15

| Sample No. | Amount Silica (gm) | % LA Removed |
|---|---|---|
| 70 | 0.0519 | 81% |
| 107 | 0.0515 | 94% |
| 73 | 0.0512 | 84% |
| 75 | 0.0507 | 70% |
| 69 | 0.0508 | 90% |
| 68 | 0.0505 | 82% |
| 106 | 0.0513 | 92% |
| 109 | 0.0512 | 91% |
| 71 | 0.0512 | 94% |

Although the invention has been described with reference to the presently preferred embodiments, it should be understood that various modifications could be made without departing from the scope of the invention.

What is claimed is:

1. A method for reducing off-flavor in a beverage comprising the steps of:
   a. obtaining an off-flavor beverage,
   b. contacting the beverage with silica filter media whose surface active groups have been reacted with one or more silanes,
   c. binding one or more off-flavor components to the silica filter media, and
   d. separating the beverage from the silica filter media;
   wherein said silane has a moiety selected from the group consisting of quaternary ammonium, aryl, epoxy, urea, methacrylate, imidazole, carbonyl, isothiorium, sulfonate, phosphonate, urethane, ureido, isocyano, sulfhydryl, carboxylate, amide, pyrrole, and ionic moiety.

2. The method according to claim 1, wherein said contacting is mixing.

3. The method according to claim 1, wherein contacting the beverage with the silica filter media is filtering the beverage through the silica filter media.

4. The method according to claim 1, wherein step (b) further comprises simultaneous capturing microorganisms by the silica filter media.

5. The method according to claim 1, wherein said one or more off-flavor components are off-flavor substances.

6. The method according to claim 5, wherein said off-flavor substances are trans-2-nonenal, diacetyl, or cis-3-nonenal.

7. The method according to claim 1, wherein said off-flavor components are off-flavor precursors.

8. The method according to claim 7, wherein the off-flavor precursors are linoleic acid.

9. The method according to claim 1, wherein said beverage is an alcoholic, a fruit, or a vegetable beverage.

10. The method according to claim 9, wherein said beverage is beer.

11. The method according to claim 1, wherein said silica filter media are rice hull ash, oat hull ash, or diatomaceous earth.

12. The method according to claim 1, wherein said silane further comprises a hydrolyzable moiety that reacts with the active group on the silica filter media, wherein said hydrolysable moiety is selected from the group consisting of alkoxy, halogen, hydroxy, aryloxy, amino, amide, methacrylate, mercapto, carbonyl, urethane, pyrrole, carboxy, cyano, aminoacyl, acylamino, alkyl ester, and aryl ester.

13. The method according to claim 12, wherein said hydrolyzable moiety is an alkoxy group.

14. The method according to claim 13, wherein said silane is a mono-, di-, or trialkoxysilane.

15. The method according to claim 14, wherein said silane is n-octadecyltriethoxysilane.

16. The method according to claim 14, wherein said silane is phenyltriethoxysilane.

17. The method according to claim 14, wherein said silane is n-octytriethoxysilane.

18. The method according to claim 1, wherein said silane has a quaternary ammonium moiety of 3-(trimethoxysilyl)propyloctadecyldimethylammoniumchloride, or N-trimethoxysilylpropyl-N,N,N-trimethylammoniumchloride.

19. The method according to claim 1, wherein said silane has an aryl moiety of 3-(trimethoxysilyl)-2-(p,m-chloromethyl)-phenylethane, 2-hydroxy-4-(3-triethoxysilylpropoxy)-diphenylketone, ((chloromethyl)phenylethyl)trimethoxysilane, or phenyldimethylethoxysilane.

20. The method according to claim 1, wherein said silane has an epoxy moiety of 3-glycidoxypropyltrimethoxysilane or 2-(3,4-epoxycyclohexyl)ethyltrimethoxysilane.

21. The method according to claim 1, wherein said silane has an urea moiety of N-(triethoxysilylpropyl)urea or N-1-phenylethyl-N'-triethoxysilylpropylurea.

22. The method according to claim 1, wherein said silane has a methacrylate moiety of 3-(trimethoxysilyl)propyl methacrylate.

23. The method according to claim 1, wherein said silane has an imidazole moiety of N-[3-(triethoxysilyl)propyl]imidazole or N-(3-triethoxysilylpropyl)-4,5-dihydroimidazole.

24. The method according to claim 1, wherein said silane has an isocyano moiety of tris(3-trimethoxysilylpropyl)isocyanurate or 3-isocyanatopropyltriethoxysilane.

25. The method according to claim 1, wherein said silane has a sulfhydryl moiety of 3-mercaptopropyltriethoxysilane.

26. The method according to claim 1, wherein said silane has an ether moiety of bis[(3-methyldimethoxysilyl)propyl]-polypropylene oxide or N-(triethoxysilylpropyl)-O-polyethylene oxide urethane.

27. The method according to claim 1, wherein said silane has a carbonyl moiety of 3-(triethoxysilyl)propylsuccinic anhydride.

28. The method according to claim 1, wherein said silane has a sulfonate moiety of 2-(4-chlorosulfonylphenyl)-ethyltrichlorosilane.

29. The method according to claim 1, wherein said silane has an isothiourium moiety of trimethoxysilylpropylisothiouronium chloride.

30. The method according to claim 1, wherein said silane has an amide moiety of triethoxysilylpropylethyl-carbamate, N-(3-triethoxysilylpropyl)-gluconamide or N-(triethoxysilylpropyl)-4-hydroxybutyramide.

31. The method according to claim 1, wherein said silane has a urethane moiety of N-(triethoxysilylpropyl)-O-polyethylene oxide urethane or O-(propargyloxy)-N-(triethoxysilylpropyl)urethane.

32. The method according to claim 1, wherein said silane has an ionic moiety of 3-(trimethoxysilyl)propyl-ethylenediamine triacetic acid trisodium salt; or 3-(trihydroxysilyl)propylmethylphosphonate sodium salt.

33. The method according to claim 1, wherein said one or more silanes are N-trimethoxysilylpropyl-N,N,N-trimethylammonium chloride and bis(2-hydroxyethyl)-3-aminopropyltriethoxysilane.

34. A method for preventing or reducing off-flavor in a beverage comprising the steps of:
a. obtaining an off-flavor beverage,
b. contacting the beverage with silica filter media whose surface active groups have been reacted with two silanes,
c. binding one or more off-flavor components to the silica filter media, and
d. separating the beverage from the silica filter media,
wherein said two silanes are selected from the group consisting of 3-aminopropyltrimethoxysilane and N-(triethoxysilylpropyl)-O-polyethylene oxide urethane; 3-trihydrosilylpropylmethylphosphonate, sodium salt and N-(triethoxysilylpropyl)-O-polyethylene oxide urethane; N-trimethoxysilylpropyl-N,N,N—Cl, trimethylammonium chloride and (3-glycidoxypropyl)trimethoxysilane;
3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene oxide urethane; 2-(trimethoxysilylethyl)pyridine and N-(3-triethoxysilylpropyl)-gluconamide; N-trimethoxysilylpropyl-N,N,N—Cl, trimethylammonium chloride and N-(3-triethoxysilylpropyl)-gluconamide;
N-trimethoxysilylpropyl-N,N,N—Cl, trimethylammonium chloride and 2-hydroxy-4-(3-triethoxysilylpropoxy)-diphenylketone; 3-mercaptopropyltriethoxysilane and N-(triethoxysilylpropyl)-O-polyethylene oxide urethane; 3-(triethoxysilyl)propylsuccinic anhydride and N-(triethoxysilylpropyl)-O-polyethylene oxide urethane; trimethoxysilylpropyl-ethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and bis-(2-hydroxyethyl)-3-aminopropyltriethoxysilane.

35. The method according to claim 1, wherein said silane-reacted silica filter media have a general formula selected from the group consisting of particle-O—Si(R$^1$)$_x$(R$^2$)$_{3-x}$R$^3$,

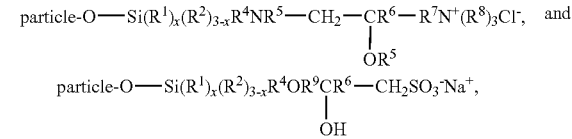

wherein R$^1$ is alkoxy, halogen, hydroxy, aryloxy, amino, amide, methacrylate, mercapto, carbonyl, urethane, pyrrole, carboxy, cyano, aminoacyl, or acylamino, alkyl ester, or aryl ester R$^2$ and R$^8$ are independently substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

R$^3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylalkaryl, alkoxy, halogen, hydroxy, aryloxy, amino, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by halogen, hydroxy, amino, carboxy, or cyano;

$R^5$, $R^6$, $R^8$ are independently hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, ether, ester or arylalkaryl;

$R^4$, $R^7$, $R^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments.

36. Silane-treated silica filter media, wherein the silane is selected from the group consisting of octadecyltriethoxysilane, n-octytriethoxysilane and phenyltriethoxysilane.

* * * * *